(12) United States Patent
Saint-Louis

(10) Patent No.: US 11,110,334 B2
(45) Date of Patent: Sep. 7, 2021

(54) GOLF TRAINING AID APPARATUS AND METHOD

(71) Applicant: Leslie A. Saint-Louis, New York, NY (US)

(72) Inventor: Leslie A. Saint-Louis, New York, NY (US)

(*) Notice: Subject to any disclaimer, the term of this patent is extended or adjusted under 35 U.S.C. 154(b) by 443 days.

(21) Appl. No.: 16/188,225

(22) Filed: Nov. 12, 2018

(65) Prior Publication Data

US 2020/0147471 A1 May 14, 2020

(51) Int. Cl.
| A63B 69/36 | (2006.01) |
| A63B 71/06 | (2006.01) |
| A63B 102/32 | (2015.01) |

(52) U.S. Cl.
CPC ...... *A63B 69/3661* (2013.01); *A63B 69/3608* (2013.01); *A63B 69/3617* (2013.01); *A63B 71/0622* (2013.01); *A63B 71/0686* (2013.01); *A63B 2102/32* (2015.10); *A63B 2220/51* (2013.01); *A63B 2220/56* (2013.01); *A63B 2220/62* (2013.01); *A63B 2220/833* (2013.01); *A63B 2225/50* (2013.01)

(58) Field of Classification Search
CPC ............ A63B 69/3661; A63B 69/3608; A63B 69/3617; A63B 71/0622; A63B 71/0686; A63B 2102/32; A63B 2220/51; A63B 2220/56; A63B 2220/62; A63B 2220/833; A63B 2225/50
USPC ........................................................ 473/252
See application file for complete search history.

(56) References Cited

U.S. PATENT DOCUMENTS

| 5,718,639 | A | * | 2/1998 | Bouton | A63B 69/3614 |
| | | | | | 473/151 |
| 6,030,109 | A | * | 2/2000 | Lobsenz | A63B 71/0622 |
| | | | | | 700/92 |
| 10,058,759 | B1 | | 8/2018 | Saint-Louis | |
| 2012/0046907 | A1 | * | 2/2012 | Scott | A63B 69/3608 |
| | | | | | 702/151 |
| 2016/0199693 | A1 | * | 7/2016 | Vermilyea | A61B 5/1128 |
| | | | | | 700/91 |
| 2016/0310820 | A1 | * | 10/2016 | Kline | G06F 3/00 |

* cited by examiner

*Primary Examiner* — John E Simms, Jr.
*Assistant Examiner* — Rayshun K Peng
(74) *Attorney, Agent, or Firm* — Zale Patent Law, Inc.; Lawrence P. Zale

(57) ABSTRACT

A golf training aid 100 has a sensor mat 105 placed under a golf mat 200. The sensor mat 105 has pressure-sensitive impact sensors 210 disposed in first, second and third regions. It includes an electronic circuit which activates a first indicator green upon an ideal impact detected by impact of a golf club head on pressure-sensitive impact sensors 210 in the first region, a second indicator yellow upon a thin impact, or the third indicator red upon a fat shot impact detected by the impact sensors 210. The golf training aid 100 also includes a wearable module 700 attached to the golfer's waist. It includes an accelerometer which measures rotational motion of the wearable device 700 and wirelessly transmits a signal to a base module 600 which activates an indicator to show under-rotation, proper rotation and over-rotation of the golfer's hips at impact of the golf ball 305.

20 Claims, 30 Drawing Sheets

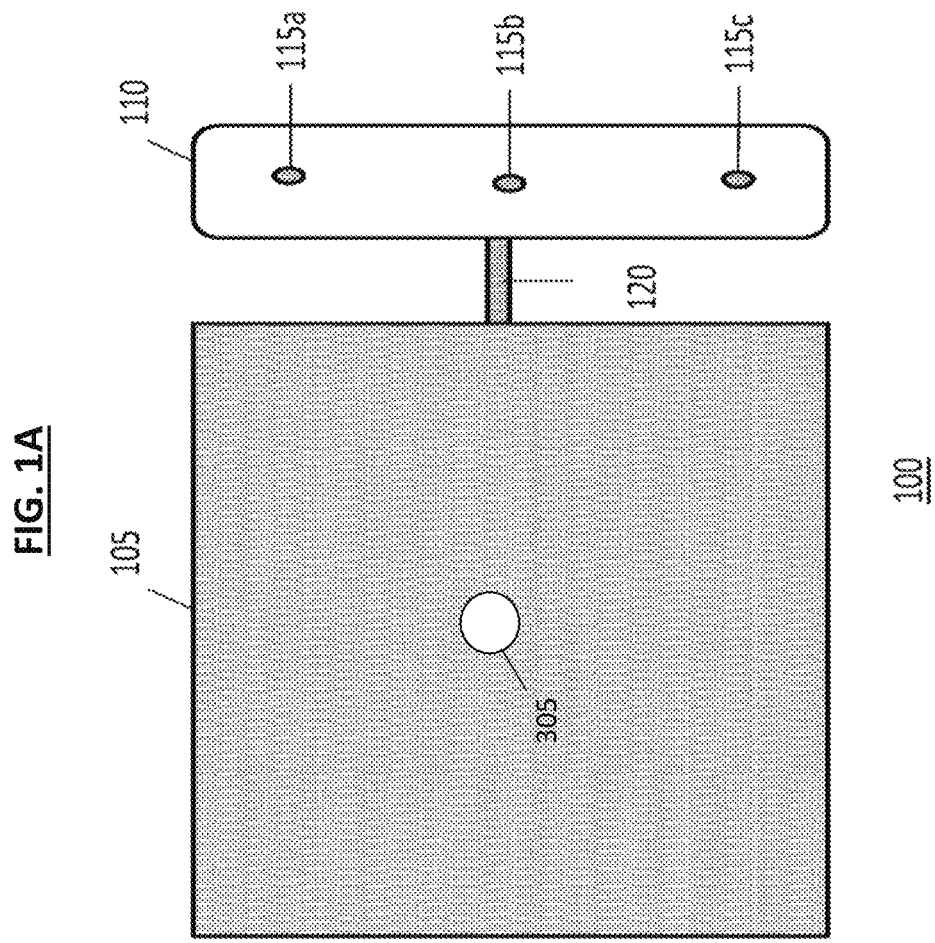

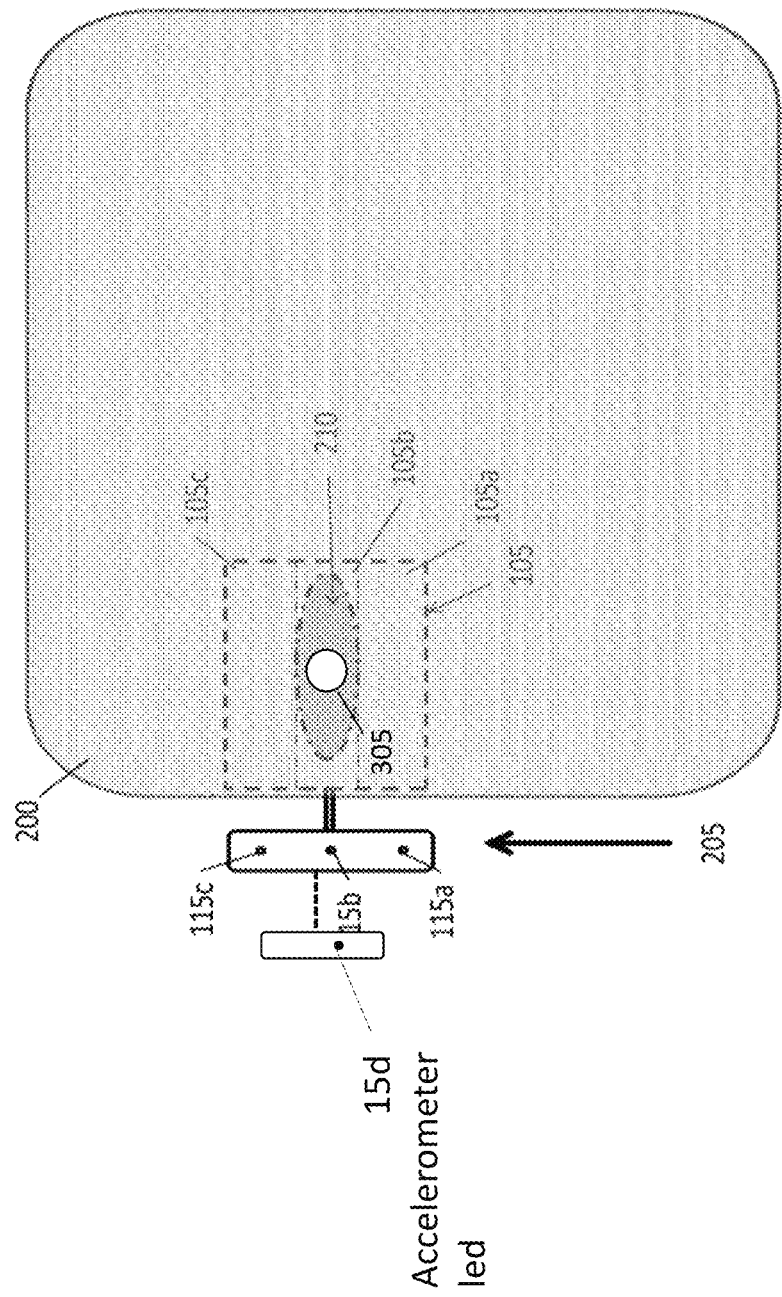

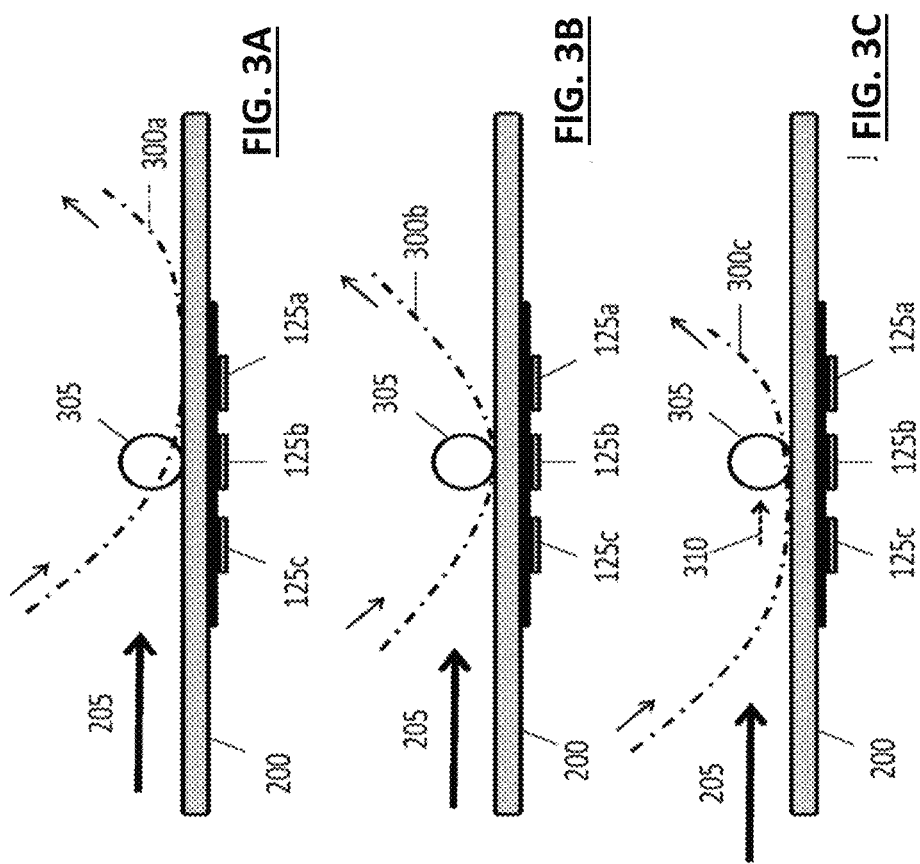

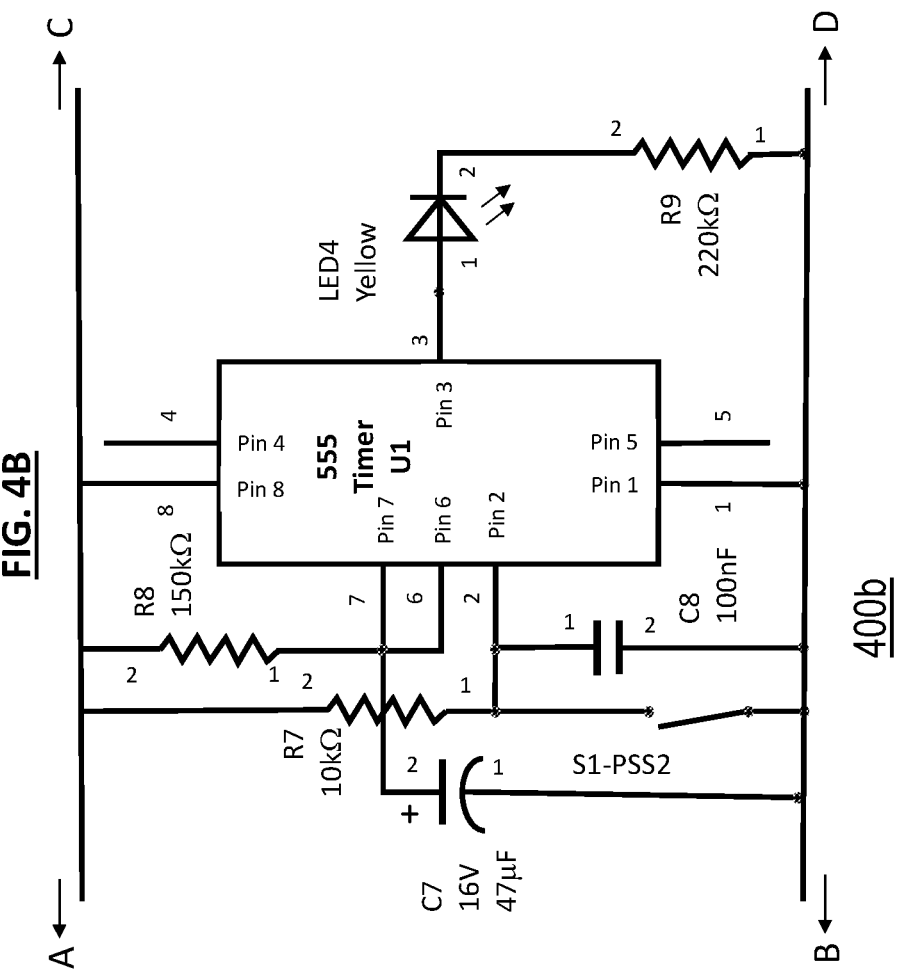

Indicator 115-1 membr. pot. 210a

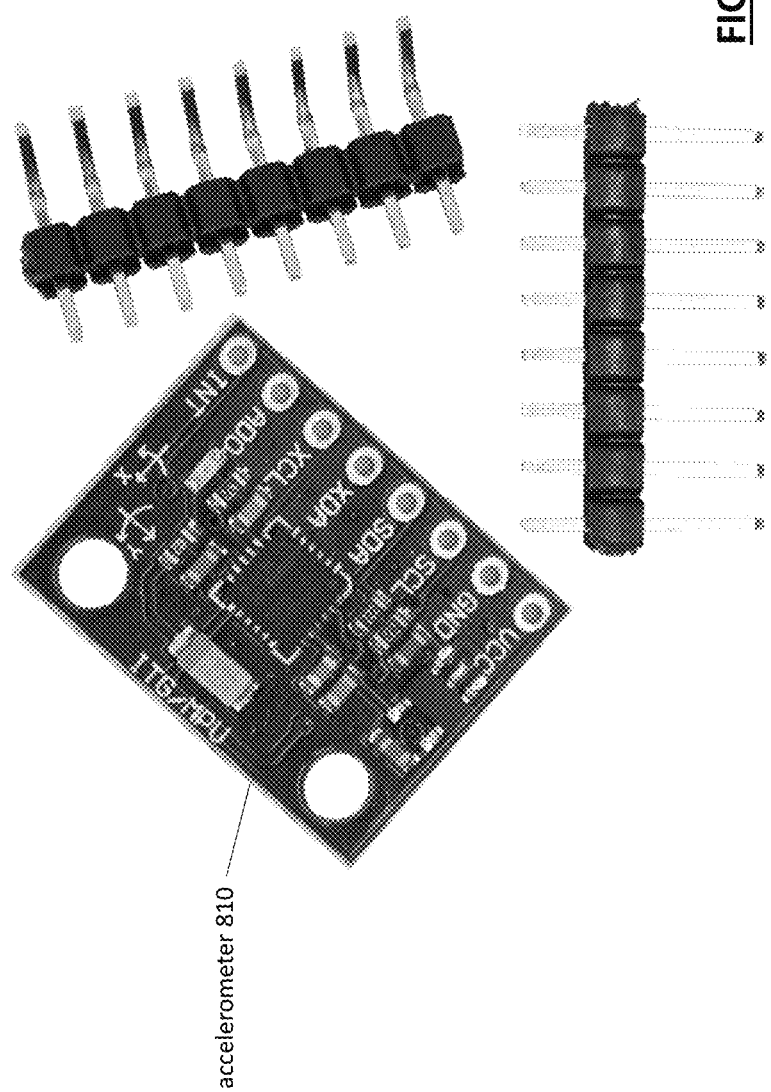

GOLF TRAINING AID APPARATUS AND METHOD

FIELD OF THE INVENTION

The present invention relates to athletic training aids and, more particularly, to a method and apparatus for providing timely feedback on a club head impact point and hip rotation of a golfer during a golf swing.

BACKGROUND OF THE INVENTION

Golf is a globally popular sport with many enthusiasts. It is widely known as a sport that is difficult to master and there have been many training videos, apparatuses, magazines, guides, schools, etc., devoted to helping players improve their game. Crucial skill elements to a golf game include putting, chipping, pitching, and ball striking, each with their unique requirements and corresponding practice environments. Putting may be practiced on a practice green and chipping/pitching may be practiced either at a driving range or a devoted practice green with extended chipping/pitching areas. Ball striking is usually practiced at a driving range.

Practice greens for practicing putting and/or chipping usually reproduce natural lie conditions of an actual course. For example, many golf courses provide such greens that closely simulate the conditions on the courses themselves. Additionally, some golf courses provide driving ranges that reproduce the lie conditions on, say, the fairways of the courses themselves.

However, maintaining such lie conditions on a driving range, particularly for high volume use, is not always practical. As such, many driving ranges, especially stand-alone practice facilities, provide artificial turf mats for ball striking, pitching, and/or chipping practice.

While artificial mats provide improved durability and, thus, cost reduction, they fail to accurately simulate actual game conditions in important but unobvious ways. For example, a commercial golf mat on a practice driving range is very forgiving. The golf club can hit well behind the golf ball and slide along or bounce over the surface of the mat to hit the ball, resulting in an apparently good ball flight and distance. On the other hand, on the golf course, the ground may not be similarly forgiving due to the softness or other condition of natural turf. A similar swing impacting behind the ball may cause the club head to dig into the ground or otherwise hinder inertia, resulting in a "fat shot" with reduced clubhead speed or direction and a ball flight of lesser distance, perhaps travelling only a few yards. Because the ball hit in a driving range may not show significant limitations in ball travel distance due to a "fat shot," the golfer may not recognize that his club hit the ground behind the ball and thus the practice might not be as productive as it could be.

In addition, golfers have no way of knowing if they are swinging properly. One aspect of a golf swing is hip rotation. It is commonly accepted that a golfer's hip rotation should be within a specific range of rotation when the club impacts the ball. It is difficult for a golfer to determine what positions his hips are in when hitting the ball. The golfer is also trying to keep his eye on the ball and monitor other aspects of his/her swing simultaneously.

Even with another person watching the golfer swing, it is difficult to monitor and determine hip position and location of impact accurately.

U.S. Pat. 10,058,759 B1 issued Aug. 28, 2018 to Leslie A. Saint-Louis (the same inventor of this application) entitled "Golf Training Aid, Apparatus and Method" provided feedback to a golfer as to his/her swing and impact location. Even though this is an advancement above the prior art, there are additional aspects of a golfer's swing which should also be monitored and adjusted to improve the golfer's form, shot distance and accuracy.

Currently, there is a need for a system which accurately monitors several aspects of a golfer's swing to provide feedback to the golfer.

SUMMARY OF THE INVENTION

It is, therefore, an object of the invention to provide appropriate feedback to a player practicing ball striking, pitching, or chipping off a golf mat at home or at a driving range so that the player is not misled into a false sense of having made a good golf swing by feeling reasonably acceptable impact with the golf mat under the practice ball and by observing an apparently good ball flight after impact.

In accordance with an exemplary embodiment of the invention, a golf training aid apparatus comprises a sensor mat that is adapted to be placed beneath a conventional golf mat.

The sensor mat comprises three sensor locations (regions or zones) each provided with one or more pressure or force sensitive switches (sensors) for detecting an impact location of a golf swing on the conventional golf mat. The sensors are coupled to respective indicators, such as LEDs (light emitting diodes) with different colors, for indicating, to the player, corresponding impact locations that are detected by the sensors.

According to an exemplary embodiment of the invention, the sensors are coupled to the indicators via a timing circuit that triggers the respective indicator for a predetermined period of time. The timing circuit is also configured to trigger all the indicators for the predetermined period of time upon being coupled to an energy source to provide the player with a preview of the indicator duration and proper functioning of all indicators.

The apparatus is further provided with a handedness switch for reassigning the sensor/indicator coupling to accommodate left-handed players, who would place the sensor mat beneath the golf mat on an opposite side. In accordance with an alternative embodiment, the components of the golf training aid apparatus may be integrated with a golf mat.

Other features and advantages of the present invention will become readily apparent from the following detailed description and the accompanying drawings.

BRIEF DESCRIPTION OF THE DRAWINGS

The above and related objects, features and advantages of the present invention will be more fully understood by reference to the following, detailed illustrative description of a preferred embodiment of the present invention when taken in conjunction with the accompanying figures, wherein:

FIG. 1A is a plan view illustrating an exterior configuration of a golf training aid apparatus according to an exemplary embodiment of the invention.

FIGS. 2A and 2B are plan views illustrating the golf training aid apparatus of FIG. 1A in use with a driving range mat for right-handed golfers and left-handed golfers, respectively, in accordance with an exemplary embodiment of the invention.

FIGS. 3A-3C are side section views along line X-X in FIG. 2A illustrating an ideal impact, a thin impact, and a fat shot impact, respectively, as detected by the golf training aid apparatus according to an exemplary embodiment of the invention.

FIGS. 4A-4C are schematic circuit diagrams of the electronic components of the golf training aid apparatus of FIG. 1A.

FIG. 11A is a GY 521 MPU-6050 3-axis gyroscope Module 6 DOF 6-axis Accelerometer Gyroscopic Sensor Module with a 16-bit A/D converter, data output IIC, I2C accelerometer which in one embodiment, may be used as the accelerometer shown in FIG. 10.

DETAILED DESCRIPTION

Figure 1B:
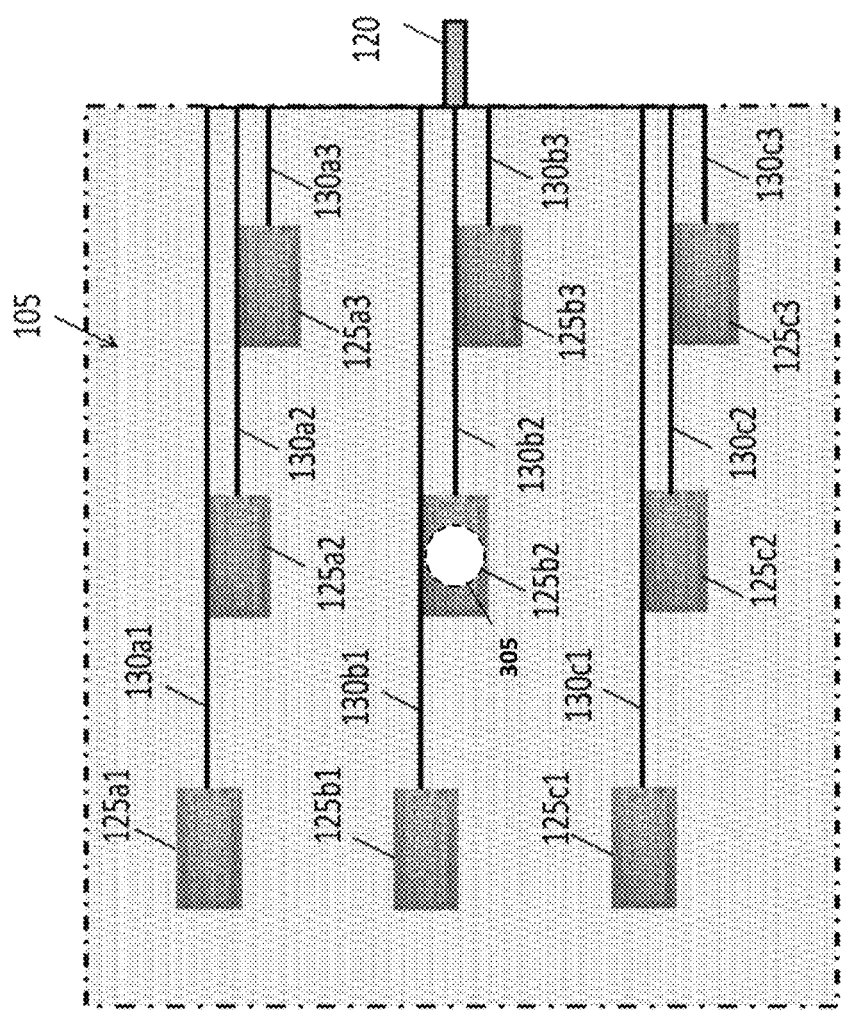
FIG. 1B in a plan section of a sensor mat of the golf training aid apparatus of FIG. 1A in accordance with an exemplary embodiment of the invention.

FIG. 1A is a plan view illustrating an exterior configuration of a golf training aid apparatus 100 according to an exemplary embodiment of the invention. As shown in FIG. 1A, apparatus 100 may comprise a sensor mat 105, a housing 110 with indicators 115a-c, and a connector 120. In accordance with an exemplary embodiment of the invention, sensor mat 105 may comprise two rubber or vinyl sheets stacked together to form a thin inner enclosure that accommodates pressure sensitive switches or force sensitive resistor switch sensors (hereinafter referred to collectively as "sensors"). Each rubber or vinyl sheet may be, for example, $\frac{1}{16} \times 8\frac{1}{2} \times 11$ or $\frac{3}{32} \times 8\frac{1}{2} \times 11$ inches—made from a Buna (Nitrile) rubber, or the like—forming an $8\frac{1}{2} \times 11$-inch sensor mat 105 with a thickness of approximately $\frac{1}{8}$ to $\frac{3}{16}$ inches including the internal sensors, connectors, couplings, etc.

According to an embodiment of the invention, sensor mat 105 may comprise one $\frac{3}{32} \times 8\frac{1}{2} \times 11$ inch sheet and one $\frac{1}{16} \times 8\frac{1}{2} \times 11$ sheet.

The two rubber or vinyl sheets may also be integrated into a singular mat with an internal pocket that accommodates the sensors.

As will be detailed below, sensors within sensor mat 105 are arranged into three rows, each row respectively activating one of the three (3) indicators 115a, 115b, and 115c. According to an exemplary embodiment of the invention, indicators 115a, 115b, and 115c may be light emitting diodes (LEDs), or the like. Indicators 115a and 115c may be switchable between green (for indicating an ideal impact) and red (for indicating a "fat shot" impact behind the ball) by a "handedness" switch (not shown) on housing 110 for accommodating right-handed and lefthanded golfers, as detailed below. Indicator 115b may embody a yellow LED for indicating a "thin impact", where the golf swing fails to make a full impact on the ball and the ground after impact with the ball.

FIG. 1B illustrates an arrangement of sensors 125 (125a1-125c3) within the sensor mat 105 shown in FIG. 1A. In accordance with an exemplary embodiment of the invention, sensor mat 105 may comprise two (top and bottom) sheets of rubber (e.g., Buna rubber and the like) or vinyl between which are disposed the sensors 12S illustrated in FIG. 1B. The two (top and bottom) sheets of rubber may be integrated into one unit wherein an internal enclosure houses the sensors 125 in the arrangement shown in FIG. 1B. According to an exemplary embodiment of the invention, the top and bottom sheets of rubber of the sensor mat 105 may be approximately $\frac{1}{16}$ to $\frac{3}{32}$ inches thick.

As shown in FIG. 1B, sensors 125 may be arranged in three respective rows corresponding to the three impact locations along a swing plane of the player. For example, sensors 125a1, 125a2, and 125a3 may be arranged in a row for detecting a first impact region (or zone or location) that corresponds to indicator 115a shown in FIG. 1A—in other words, either an ideal impact for a right-handed golfer (green) or a "fat shot" impact for a left-handed golfer (red), as detailed below. FIG. 1B illustrates sensors 125a1, 125a2, and 125a3 being arranged in a row with a slight offset for sensors 125a2 and 125a3 for accommodating the electrical couplings 130a1 and 130a2 (which, including coupling 130a3, may be thin wires or the like), respectively.

According to an exemplary embodiment, the slight offset of sensor 125a2 may be approximately between 0.1 to 0.5 inches from sensor 125a1 and sensor 125a3 may, in turn, be offset by approximately between 0.1 and 0.5 inches from sensor 125a2 in forming the corresponding row of sensors 125a. According to an alternative embodiment, sensors 125a1, 125a2, and 125a3 may be aligned with one another along the row with couplings 130a1 and 130a2 being arranged around or underneath the sensors 125a2 and 125a3 without departing from the scope of the invention.

According to another alternative embodiment, sensors 125a1, 125a2, and 125a3 may be embodied by one (1), two (2), three (3) or more individual sensors for detecting an impact in the first region of sensor mat 105 that corresponds to indicator 115a. For example, sensors 125a1, 125a2, and 125a3 may be embodied by one continuous vertical sensor 125a that is 6" long.

Correspondingly, sensors 125b1, 125b2, and 125b3 may be arranged in a row for detecting a second impact region (zone or location) that corresponds to indicator 115b shown in FIG. 1A—in other words, a "thin" impact for either a right-handed golfer or a left-handed golfer (yellow); and sensors 125c1, 125c2, and 125c3 may be arranged in a row for detecting a third impact region or location that corresponds to indicator 115c shown in FIG. 1A—in other words, either a "fat shot" impact for a right-handed golfer (red) or an ideal impact for a left-handed golfer (green), as detailed below. FIG. 1B illustrates sensors 125b1, 125b2, and 125b3 being arranged in a row with a slight offset for sensors 125b2 and 125b3 for accommodating the electrical couplings 130b1 and 130b2 (which, including coupling 130b3, may be thin wires or the like), respectively.

According to an exemplary embodiment, the slight offset of sensor 125b2 may be approximately between 0.1 to 0.5 inches from sensor 125b1 and sensor 125b3 may, in turn, be offset by approximately between 0.1 to 0.5 inches from sensor 125b2 in forming the corresponding row of sensors 125b.

According to an alternative embodiment, sensors 125b1, 125b2, and 125b3 may be aligned with one another along the row with couplings 130b1 and 130b2 being arranged around or underneath the sensors 125b2 and 125b3 without departing from the scope of the invention. According to another alternative embodiment, sensors 125b1, 125b2, and 125b3 may be embodied by one (1), two (2), or more than three (3) individual sensors for detecting an impact in the second region of sensor mat 105 that corresponds to indicator 115b.

For example, sensors 125b1, 125b2, and 125b3 may be embodied by one continuous vertical sensor 125b that is 6" long.

Correspondingly, sensors 125c1, 125c2, and 125c3 are arranged in a row with a slight offset for sensors 125c2 and 125c3 for accommodating the electrical couplings 130c1 and 130c2 (which, including coupling 130c3, may be thin wires or the like), respectively.

According to an exemplary embodiment, the slight offset of sensor 125c2 may be approximately between 0.1 to 0.5 inches from sensor 125c1 and sensor 125c3 may, in turn, be offset by approximately between 0.1 to 0.5 inches from sensor 125c2 in forming the corresponding row of sensors 125c.

According to an alternative embodiment, sensors 125c1, 125c2, and 125c3 may be aligned with one another along the row with couplings 130c1 and 130c2 being arranged around or underneath the sensors 125c2 and 125c3 without departing from the scope of the invention.

According to another alternative embodiment, sensors 125c1, 125c2, and 125c3 may be embodied by one (1), two (2), or more than three (3) individual sensors for detecting an impact in the third region of sensor mat 105 that corresponds to indicator 115c. For example, sensors 125c1, 125c2, and 125c3 may be embodied by one continuous vertical sensor 125c that is 6" long.

Sensors 125 (125a1-125c3) may be pressure sensitive switches (PSS) or force sensing resistor switches (FSR). The rows (125a1-3, 125b1-3, and 125c1-3) are separated by approximately 3"-3.5" from center to center of the respective switches 125—for example, between 125a1 and 125b1)—and the switches in the respective rows are separated by approximately 2"-2.5" from center-to-center along axes formed by the couplings 130a1, 130b1 and 130c1 shown in FIG. 1B—for example, between sensors 125a1 and 125a2. According to an exemplary embodiment, the sensors 125 have a radius of activation of approximately 1 to 2-½ inches depending on the golf mat thickness.

Figure 2A:
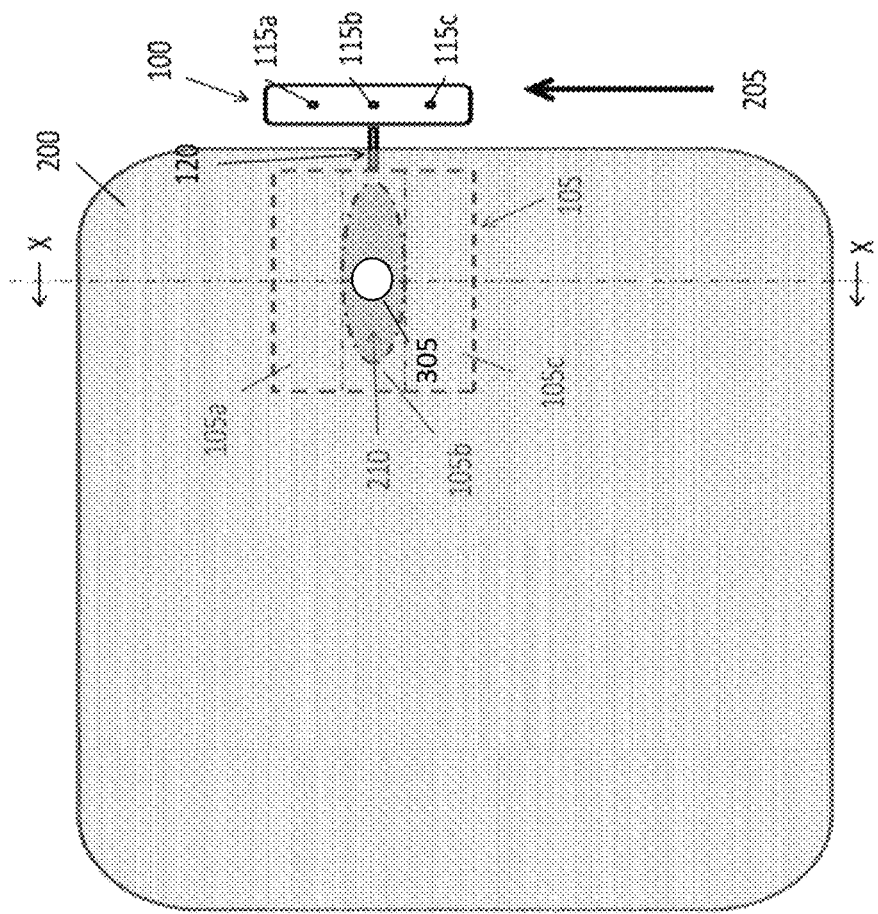

FIG. 2A is a plan view illustrating the use of the golf training aid apparatus 100 with a conventional golf mat 200—for example, at a driving range or at home (say, with a golf net)—by a right-handed golfer and FIG. 2B is a plan view illustrating the use by a left-handed golfer. As shown in FIGS. 2A and 2B, sensor mat 105 is placed underneath golf mat 200 at a location where a practice ball is to be placed—for example, in ball placement zone indicated by area 210 indicating zone 210—for chipping, pitching, or striking in the direction 205. As shown in FIGS. 2A and 2B, direction 205 reflects a swing direction axis along which first, second, and third sensor regions 105a, 105b, and 105c are arranged. With reference to FIG. 1B, sensors 125 (125a1-125c3) are respectively arranged in rows 125a, 125b, and 125c along axes that are orthogonal to the swing direction axis. It is noted that right-handed and left-handed golfers swing towards the same direction 205 (substantially parallel swing direction axes) in nearly all driving ranges, with a left-handed golfer facing an opposite direction, as reflected by the opposite sides of golf mat 200 shown in FIGS. 2A and 2B, respectively. Again, each row of sensors 125a, 125b, and 125c may be embodied by one (1), two (2), or more than three (3) individual sensors. As further illustrated in FIG. 2A, connector 120, which accommodates couplings 130 (130a1-130c3) towards internal circuitry in housing 110 corresponding to indicators 115a-c (which will be described in further detail below), may be situated at a ball placement location such that the golfer may place the practice ball on the golf mat 200 according to the location at which connector 120 extends from under the golf mat 200 towards housing 110 of apparatus 100. As shown in FIGS. 2A and 2B, a golf ball 305 is placed within indicating zone 210, which corresponds to second sensor region 105b in line over the center pressure sensitive switch(es) 125b1-3 (yellow LED).

According to an embodiment of the invention, golf training aid apparatus 100 may further comprise a foldable thin bar (not shown) extending from the center outer edge (at zone 105b) of the rubber base of sensor mat 105 to fold onto the edge of the golf mat 200 for indicating zone 210 to the golfer. As an example, the foldable bar may be a 1" wide x ⅝"long, three (3) piece, two hinged plastic or metal center alignment indicator that is attached to the top center edge of the rubber base of sensor mat 105 and that folds over the golf mat 200 to indicate the position of the center switches where the golf ball should be placed (210). Along this line in zone 105b, the golf ball can be placed approximately 3" to 11" from the outer edge (proximate housing 110) of the golf mat 200. FIG. 2A further illustrates ideal impact zone 105a (for a right-handed golfer) corresponding to indicator 115a and "fat shot" impact zone 105c corresponding to indicator 115c. FIG. 2B illustrates ideal impact zone 105c (for a left-handed golfer) corresponding to indicator 115c and "fat shot" impact zone 105a corresponding to indicator 115a. As detailed below, indicators 115a and 115c can be changed between green and red by a "handedness" switch (not shown) on housing 110 for the golfer to set right-handed or left-handed use.

In practice, one of the indicators 115a, 115b, and 115c would light to indicate an impact location of a club head on the golf mat 200. However, two (2) of the indicators 115, for example, indicators 115c and 115b, may light up simultaneously to indicate that the club head has slid along the golf mat 200 greater than three (3) inches but less than six (6) inches. As detailed below with reference to FIG. 4A-FIG. 5, the indicators 115 (or LEDs) are configured to stay on for at least 8 seconds when the corresponding pressure sensitive switch(es) 125 is (are) activated to allow time for the golfer to assess the flight and distance of the ball (a proper golf shot with any club usually takes 5-6 seconds to land) before viewing the indicators 115. Shorter pitch and chip shots may take approximately 1-4 seconds before their results become apparent to the golfer.

Accordingly, the indicators 115 provide ample time for the golfer to assess a shot before viewing them. Additionally, apparatus 100 may be configured specifically for short shots with shorter indicator 115 durations or it may comprise an additional switch for changing between a "long shot mode," with longer indicator durations, and a "short shot mode," with corresponding shorter indicator durations.

FIGS. 3A-3C are side section views along line X-X in FIG. 2A illustrating an ideal impact, a thin impact, and a fat shot impact, respectively, of a right-handed golf shot in direction 205 as detected by the golf training aid apparatus 100 according to an exemplary embodiment of the invention. In particular, FIG. 3A illustrates an example of an ideal swing path 300a of a golf club head. Correspondingly, FIGS. 3B and 3C illustrate the golf club head swing paths 300b and 300c for a thin impact and a "fat shot" impact, respectively. As shown in each of FIGS. 3A, 3B, and 3C, a golf ball 305 may be placed on golf mat 200 in and around indicating zone 210 (as illustrated in FIG. 2A) above sensors 125b and each of these figures illustrates a golf club head impacting the ball through respective examples of swing paths 300a, 300b, and 300c. It is noted that swing paths 300a, 300b, and 300c are for illustration purposes only and that the arcs of these swing paths may be different depending upon the golf shot (pitch, punch, chip, full strike, etc.) and the club (woods, irons, or rescue clubs) being practiced. As shown in FIG. 3A, for an ideal golf swing 300a, a club head impacts upon the ball 305 before hitting the golf mat 200 (or ground) at a location above sensors 125a for a right-handed golfer. As shown in FIG. 3B, for a thin impact golf swing 300b, a club head impacts upon the ball 305 and golf mat 200 simultaneously but does not hit the ball sufficiently through the "sweet spot" of the club head. Sensors 125b would detect such an impact and indicator 115b would provide feedback of such a thin impact to the golfer.

FIG. 3C shows an example of a "fat shot" golf swing 300c where the club head impacts the golf mat 200 (or ground) before the golf ball 305. As described above, a golf mat 200 is more resilient than natural turf at a regular golf course and a club head is often able to slide along on its top surface, as shown by arrow 310. The sliding results in a sufficient impact on golf ball 305 so that the ball flight resembles a regular, albeit imperfect, golf shot of an average player, at times perhaps resembling a thin impact or even an ideal shot. As illustrated in FIG. 3C, sensors 125c would detect such a fat shot impact and alert the golfer, via indicator 115c. As noted before, a fat shot impact golf swing similar to swing 300c on a natural turf golf course would result in the club head digging into the ground, substantially slowing the club head and resulting in a "fat shot" that would not adequately advance the golf ball towards the hole. It is also noted that a similar slide along the top surface of golf mat 200 may occur after an impact with golf ball 305 in an ideal swing, as shown in FIG. 3A. However, such a slide would be acceptable since the ball has already been hit with an unobstructed swing before impact. Indeed, many kinds of golf shots, if hit correctly, result in divots dug from the ground of a golf course by a club head after impacting a ball.

Figure 4A:
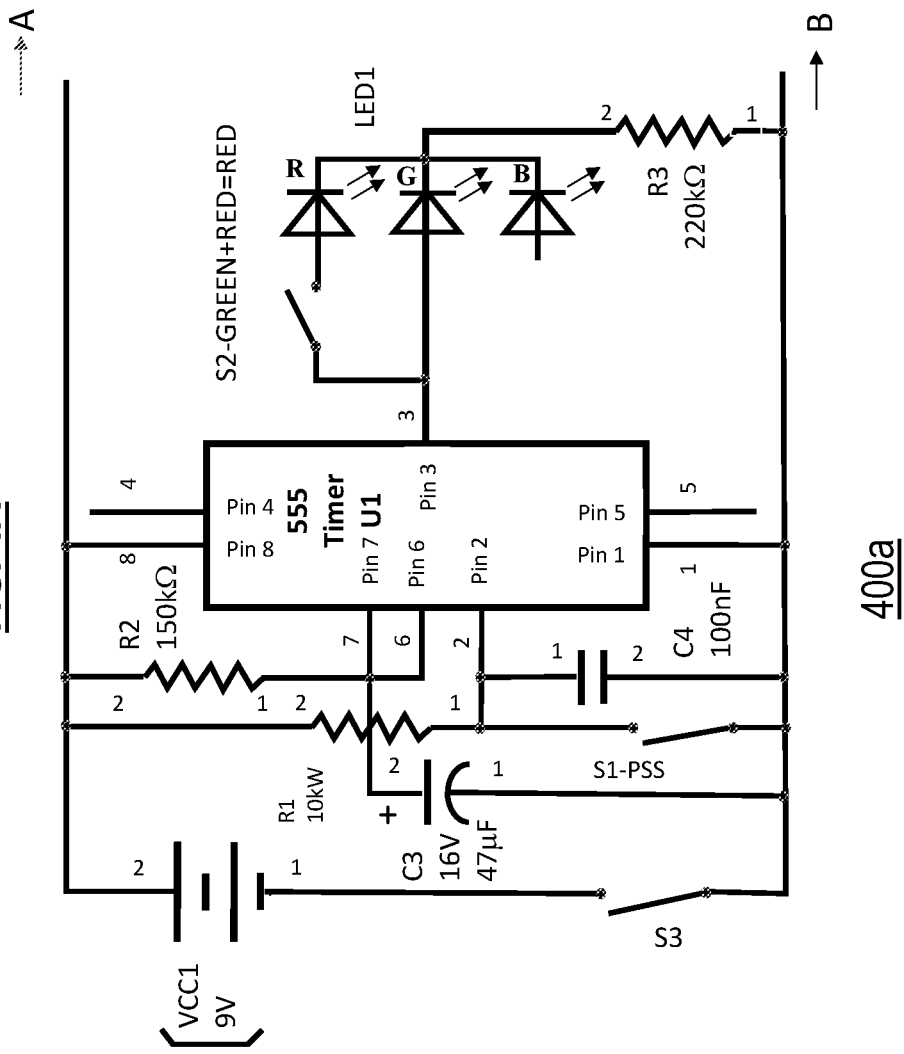
Figure 4C:
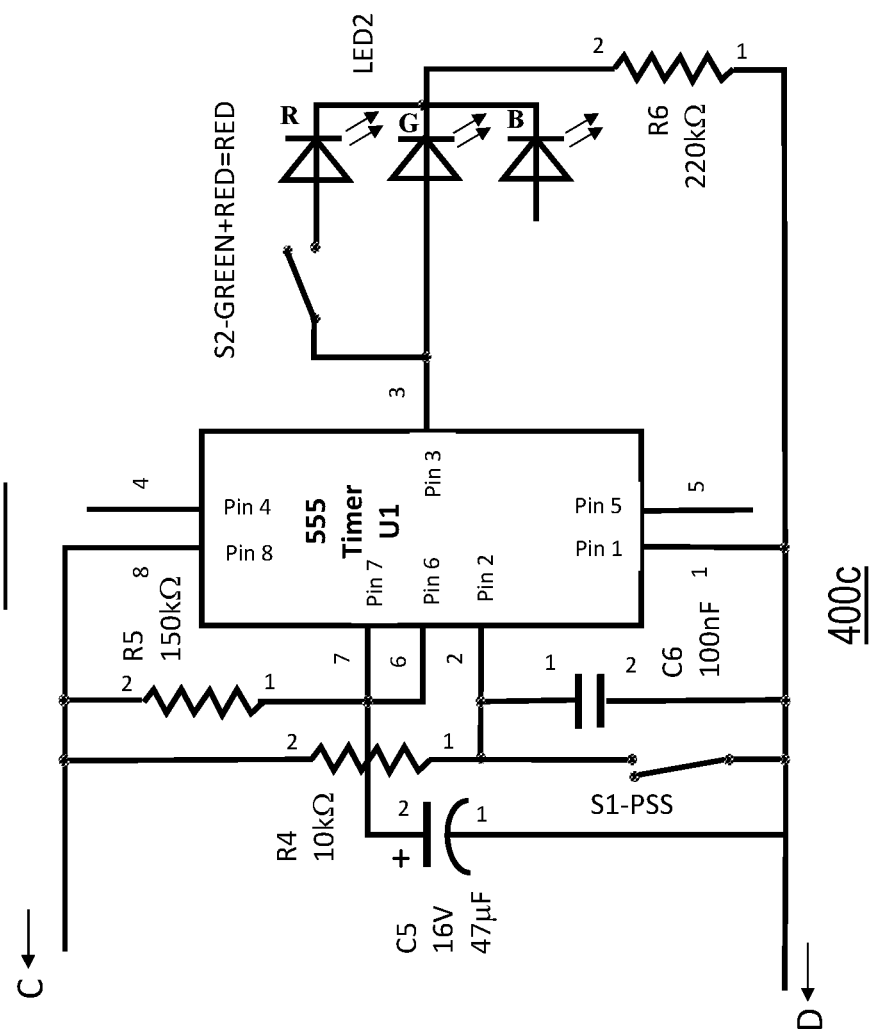

FIGS. 4A, 4B, and 4C illustrate the schematic arrangements of the circuitry 400 (400ac), including indicators 115, sensors 125, and components in housing 110, corresponding to the first, second, and third impact regions 105a, b, and c (shown in FIGS. 2A and 2B), respectively.

Referring to FIG. 4A, circuit segment 400a comprises a S1-PSS (switch-pressure sensitive switch) that corresponds to sensors 125a (1-3) and an LED1 that corresponds to indicator 115a.

A timing circuit (555 Timer U1) is used to couple sensors 125a1-3 to indicator 115a in order to provide the needed indication duration of at least 8 seconds described above. Alternative timing circuits, such as the 556 Timer, may also be used.

According to an exemplary embodiment of the invention, the 555 Timer is operated in a monostable mode but with a 100 nF (25-100 nF) capacitor C4 connected in parallel with sensors 125a to the trigger (pin 2) of the 555 timer. As an example, a resistor R1 (e.g., 10 k ohm) is connected between VCC and the trigger (pin 2); a resistor R2 (e.g., 150 k ohm) is connected between VCC (9V power source, such as one or more batteries and the like) and the discharge (pin 7); a capacitor C3 (e.g., 16V 47 mF polarized capacitor) is connected between the discharge (pin 7) and ground (GND, pin 1); an ON-OFF switch S3 is connected between VCC1 and GND; S1-PSS (or sensors 125a1-3) is connected between the trigger (pin 2) and GND; and LED1 is connected to output (pin 3) via a "handedness" switch (S2) for switching between right-handed (green) and left-handed (red) use.

As a result of adding C4 to the trigger (pin 2), upon being energized—by, say, an on-off switch and connection to power source VCC1 (9V)—an initial impulse from the on/off switch (and power source) brings the trigger (pin 2) "LOW."

Figure 5:
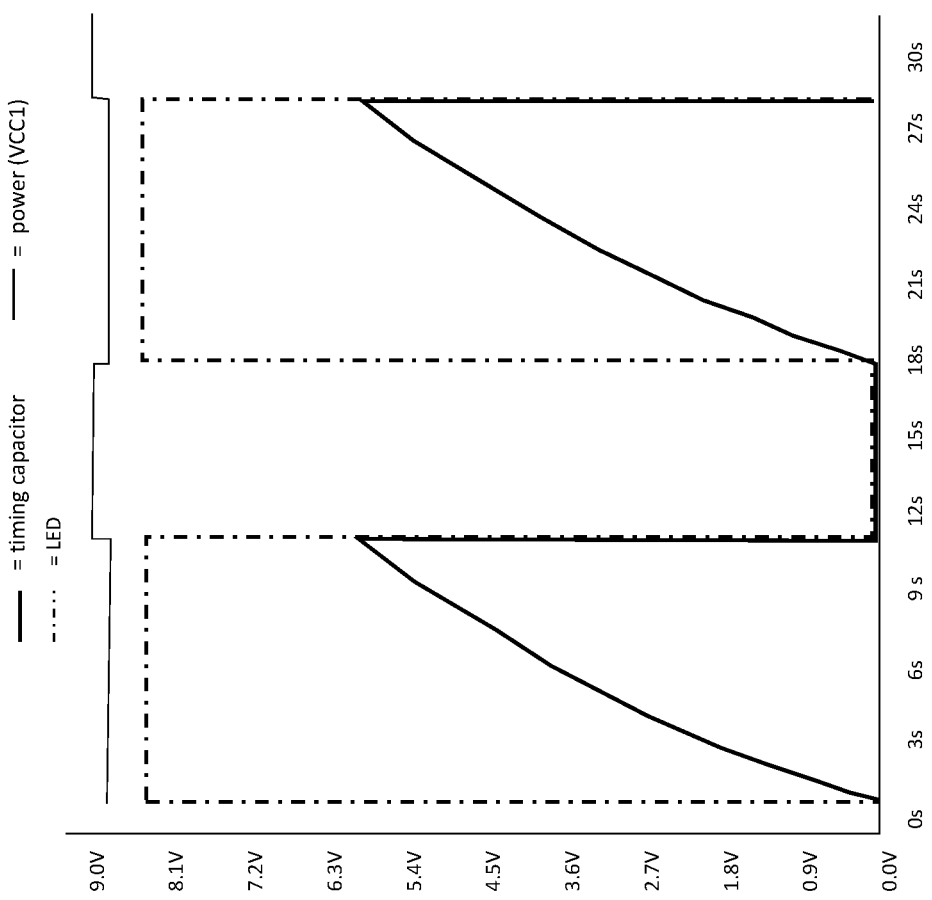
FIG. 5 is a simulation graph indicating voltage levels over time at respective portions of a circuit having an arrangement corresponding to each circuit segment illustrated in FIGS. 4A, 4B, and 4C, respectively.

FIG. 5 is a simulation graph indicating the respective voltage levels of a circuit having an arrangement corresponding to circuit segment 400a illustrated in FIG. 4A (and circuit segments 400b and 400c detailed below). As shown in FIG. 5, at t=1 second in the graph when power is applied to the circuit (via an ON-OFF switch (S3) and/or connection to a power source (VCC1)), the timer is initiated. In the simulation, the pressure sensitive switch (S1-PSS or sensor 125a1-3) is activated at 18 seconds and it also brings the trigger "LOW," again initiating the timer. As reflected in FIG. 5, the LED (LED1 or indicator 115a) is triggered upon either an initial power on or a sensor 125a being triggered, resulting in an approximately 8-10 second "ON" duration for indicator 115a. In other words, indicator 115a is triggered as if an impact is detected at any of sensors 125a1-3 upon powering on golf training aid 100. Advantageously, a golfer may be presented with a preview on how the indicator 115a would function, and that it is functioning properly, each time the apparatus 100 golf training aid 100 is turned on.

Correspondingly, referring to FIG. 4B, circuit segment 400b comprises a S1-PSS2 (switch-pressure sensitive switch) that corresponds to sensors 125b (1-3) and an LED4 that corresponds to indicator 115b. A timing circuit (555 Timer U1) is used to couple sensors 125b1-3 to indicator 115b in order to provide the needed indication duration of at least 8 seconds described above. Alternative timing circuits, such as the SS6 Timer, may also be used.

According to an exemplary embodiment of the invention, the 555 Timer is operated in a monostable mode but with a 100 nF (15-100 nF) capacitor C8 connected in parallel with sensors 12Sb to the trigger (pin 2) of the 555 Timer. As an example, a resistor R7 (e.g., 10 k ohms) is connected between VCC1 and the trigger (pin 2); a resistor R8 (e.g., 150 k ohms) is connected between VCC1 (9V power source, such as one or more batteries and the like) and the discharge (pin 7); a capacitor C7 (e.g., 16V 47 mF polarized capacitor) is connected between the discharge (pin 7) and ground (GND, pin 1); S1-PSS2 (or sensors 125b1-3) is connected between the trigger (pin 2) and GND; and LED4 (yellow) is connected to output (pin 3). As a result of adding C4 to the trigger (pin 2), upon being energized—by, say, an on-off switch or connection to power source VCC1 (9V)—an initial impulse from the on/off switch (or power source) brings the trigger (pin 2) "LOW." As described above, LED4 is yellow (or 595 nm) for indicating a "thin shot" impact, which is the same for both right-handed and left-handed use by virtue of being situated in the center region 105b of the sensor mat 105, as shown in FIG. 2.

Referring to FIG. 4C, circuit segment 400c comprises a S1-PSS1 (pressure-sensitive switch) that corresponds to sensors 125c (1-3) and an LED2 that corresponds to indicator 115c. A timing circuit (555 Timer U1) is used to couple sensors 125c1-3 to indicator 115c in order to provide the needed indication duration of at least 8 seconds described above.

Alternative timing circuits, such as the SS6 Timer, may also be used. According to an exemplary embodiment of the invention, the 555 Timer is operated in a monostable mode but with a 100 nF (25-100 nF) capacitor C6 connected in parallel with sensors 125c to the trigger (pin 2) of the 555 timer. As an example, a resistor R4 (e.g., 10 k ohms) is connected between VCC 1 and the trigger (pin 2); a resistor RS (e.g., 150 k ohms) is connected between VCC 1 (9V power source, such as one or more batteries and the like) and the discharge (pin 7); a capacitor CS (e.g., 16V 47 mF polarized capacitor) is connected between the discharge (pin 7) and ground (GND, pin 1); S1 PSS1(or sensors 125c1-3) is connected between the trigger (pin 2) and GND; and LED2 is connected to output (pin 3) via the "handedness" switch S2 for switching between right-handed (red) and left-handed (green) use. As a result of adding C4 to the trigger (pin 2), upon being energized—by, say, an on-off switch or connection to power source VCC 1 (9V)—an initial impulse from the on/off switch (or power source) brings the trigger (pin 2) "LOW."

Referring back to FIG. 5, at t=1 second in the graph when power is applied to the circuit (via an ON-OFF switch (S3) and/or connection to a power source (VCC 1)), the timer is initiated. In the simulation, the pressure sensitive switch (S1-PSS1/S1-PSS2 or sensor 125b1-3/125c1-3) is activated at 18 seconds and it also brings the trigger "LOW," again initiating the timer. As reflected in FIG. 5, the LED (LED4/LED2 or indicator 115b, 115c) is triggered upon either an initial power on or a sensor 125b/125c being triggered, resulting in an approximately 8-10 second "ON" duration for indicator 115b/c. In other words, indicator 115b/c is triggered as if an impact is detected at any of sensors 125b1-3/125c1-3 upon powering on golf training aid 100.

Circuit segments 400a, 400b, and 400c are connected in parallel at points A, B, C, and D shown in FIGS. 3A, 3B, and 3C to form a single circuit 400 for golf training aid 100 in accordance with an exemplary embodiment of the invention. Accordingly, all indicators 115a, 115b, and 115c are triggered upon powering on golf training aid 100 and a golfer is presented with a preview on how all the indicators 115a, 115b, and 115c would function, and that each is functioning properly, when the apparatus 100 golf training aid 100 is turned on.

As described above, circuitry 400 provides for an "ON" duration for indicators 115 (LEDs) of approximately 8-10 seconds upon activation of the circuit itself or a corresponding one of the sensors 125. As further described, golf training aid 100 may be configured specifically for shorter shots or may comprise a switch for changing between a "long shot mode," as described above with 8-10 second indicator durations, and a "short shot mode," with, say, 4 second indicator durations. For a "short shot" golf training aid 100, R1, R4, and R7 shown in FIGS. 4A-C, respectively, may be replaced with, for example, 5 k ohm resistors for approximately half the indicator durations of circuitry 400 shown in FIGS. 4A-4C, i.e., 4-5 seconds. According to an exemplary embodiment of the invention, R1, R4 and R7 may be connected between VCC 1 and their respective triggers (pin 2) in parallel with a respective additional resistor (with, say, the same resistance of 10 k ohm) that may be activated by a "mode change" switch (not shown)—for example, a 3-pole switch. Consequently, closing this "mode change" switch would effectively halve the resistances at R1, R4, and R7 and, correspondingly, the indicator durations. As a result, such a "mode change" switch may be incorporated in the golf training aid 100 for switching between a "long shot mode," with longer indicator durations (e.g., 8-10 seconds), and a "short shot mode," with corresponding shorter indicator durations (e.g., 4-5 seconds).

In accordance with an alternative embodiment, golf training aid 100 may embody one or more processors in place of the particular timing circuits and corresponding components, where the above-described timing features are implemented with programmed logic. Noting that such processors may increase production costs, additional features may be implemented in the programmed logic such as, without limitation, identifying and timing particular impact points upon sensor mat 105 in order to determine a swing path/plane of the golfer in addition to identifying "ideal," thick," and "thin" impacts—for example, identifying, distinguishing between, and timing impacts at sensors 125b2-125a1, 125b2-125a3, and 125b2-125a2, etc.

As discussed above, alternative timing circuits may be used in place of the 555 timers, such as the 556 timer, which would result in flashing indications at indicators 115, instead of steady indications with the 555 timer, with corresponding durations.

Figure 6:
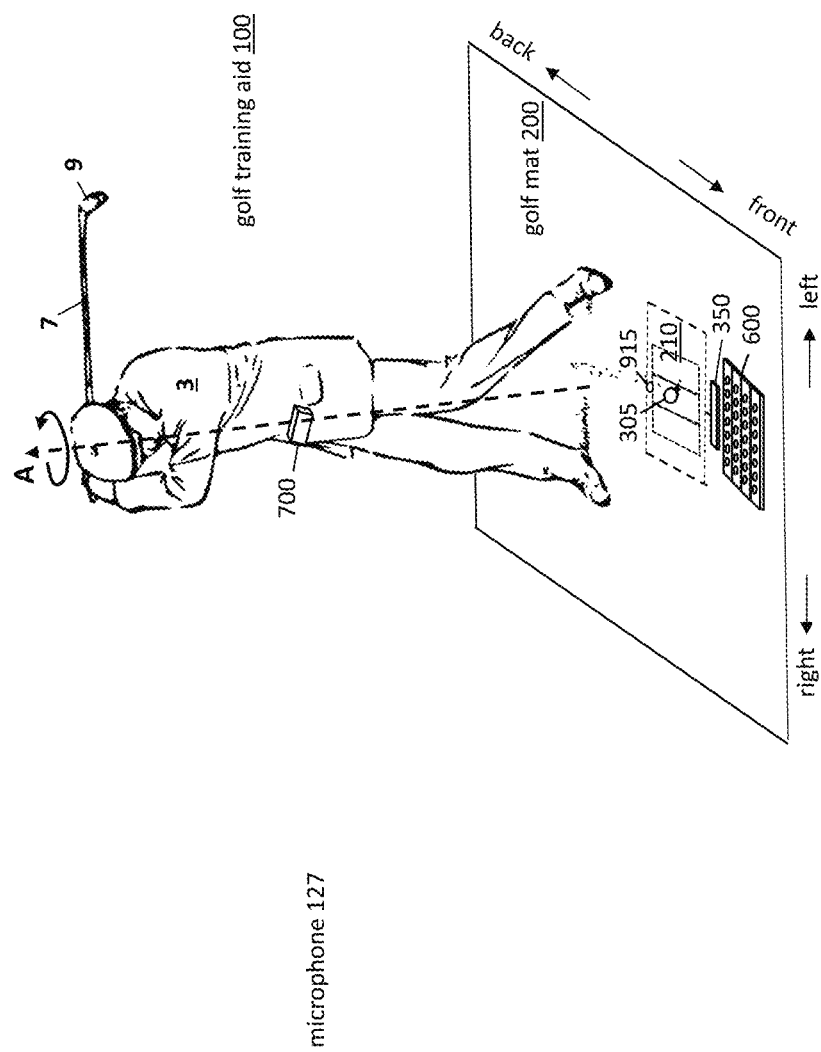
FIG. 6 is an overall view of another embodiment of the golf training aid which also monitors hip rotation of a golfer.

FIG. 6 is an overall view of another embodiment of the golf training aid which also monitors hip rotation of a golfer. This is a right-handed golfer. The directions are shown here with reference to the right-handed golfer. Directions to the golfer's left and right, front and back of the golf mat 200 are shown.

In this embodiment, a golfer 3 is standing on a golf mat 200 swinging a golf club 7 with a head 9, at golf ball 305. Golf ball 305 is teed-up on a sensor mat 105 which functions as described above. A mat sensor transmitter 350 is connected to the sensor mat 105 and can receive its output and transmit it via radiofrequency (RF) transmission.

A base module 600 receives the input from the mat sensor transmitter 350 and determines which indicators to light to indicate where the mat sensor 105 received an impact. More than one impact indicator may be lit to indicate more than one sensors of sensor mat 105 that were impacted by the golf club head 9 after a swing.

Depending upon which sensor in sensor mat 105 is impacted by the golf club head 9, base unit 600 lights at least one of the indicator lights green for an ideal golf swing, yellow for less than optimum (thin impact golf swing) and red as a poor ('fat shot') swing, as is described above.

It is important to monitor the rotation of the hips of golfer 3, and to know the rotation of the hips of golfer 3 at the time of club impact with the golf ball 5. The hip rotation at impact indicates if the golfer 3 was in proper form during the swing. Therefore, the system must be able to identify the hip rotation of golfer 3 precisely at the time of the club head 9 impacting the ball.

This embodiment also employs a wearable module 700 that is attached to the golfer 3. This is preferably attached to the golfer's waist. It employs sensors which can measure motion and can monitor the rotation of the hips of golfer 3. Proper rotation of the hips of golfer 3 is very important in optimum impact of golf ball 5. Wearable module 700 also can transmit via RF signals to base module 600.

As with the previous embodiment, there is a handedness switch which may be manually set by the golfer 3 which indicates if the golfer is a right-handed or left-handed golfer.

Figure 7:
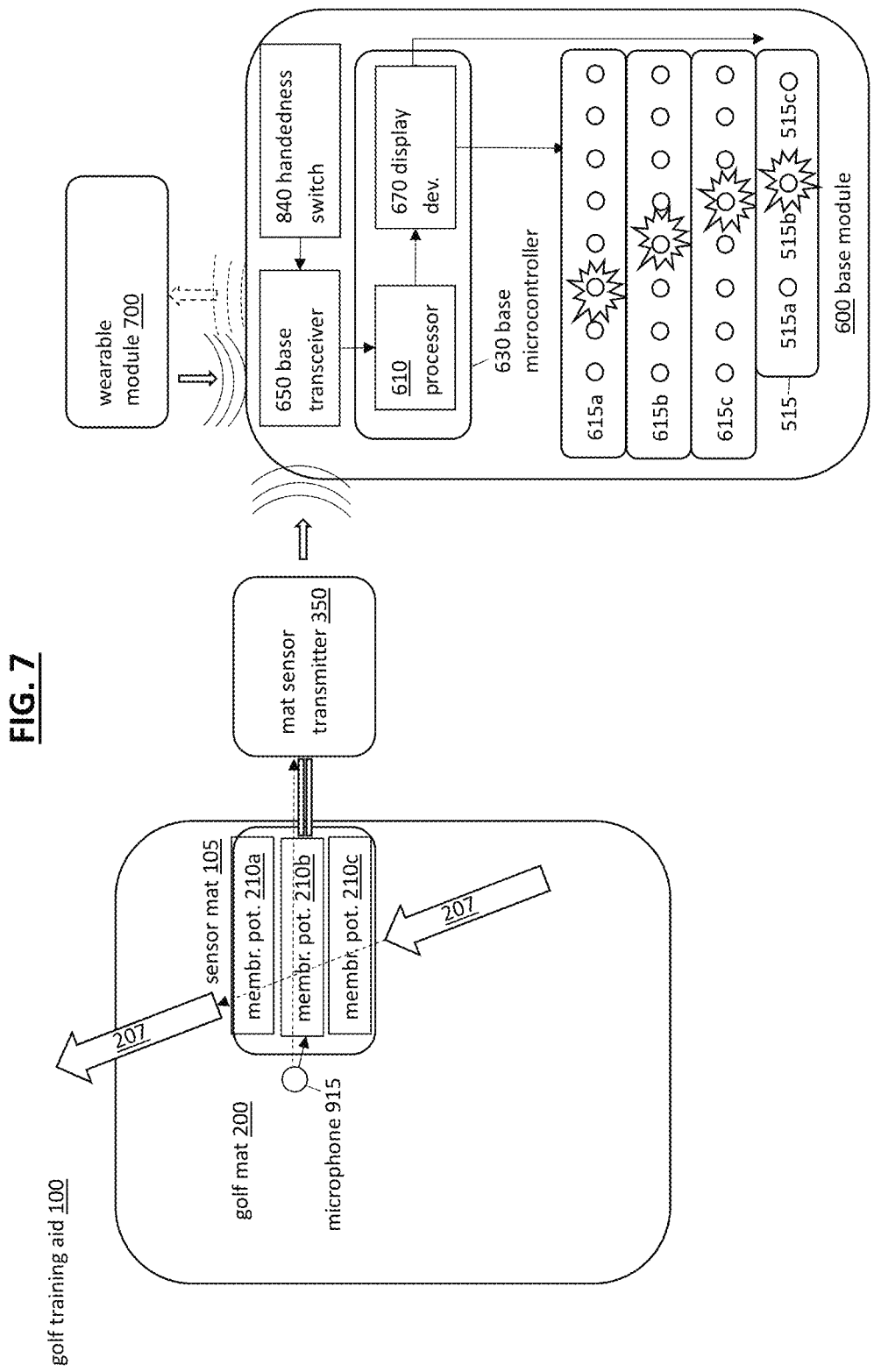
FIG. 7 is a schematic diagram of the major functional parts of the golf training aid of FIG. 6.

FIG. 7 is a schematic diagram of the major functional elements of the embodiment of FIG. 6, showing more detail of the sensor mat 105, and base module 600.

In this embodiment, as partially described for the previous embodiment, membrane potentiometers 210a, 210b and 210c (which may be referred to as "impact sensors 210a, 210b, 210c") are positioned parallel to each other from left to right of the sensor mat 105. Each membrane potentiometer 210 extends from near the front of sensor mat 105 in a direction toward the back side of sensor mat 105.

Figure 8:
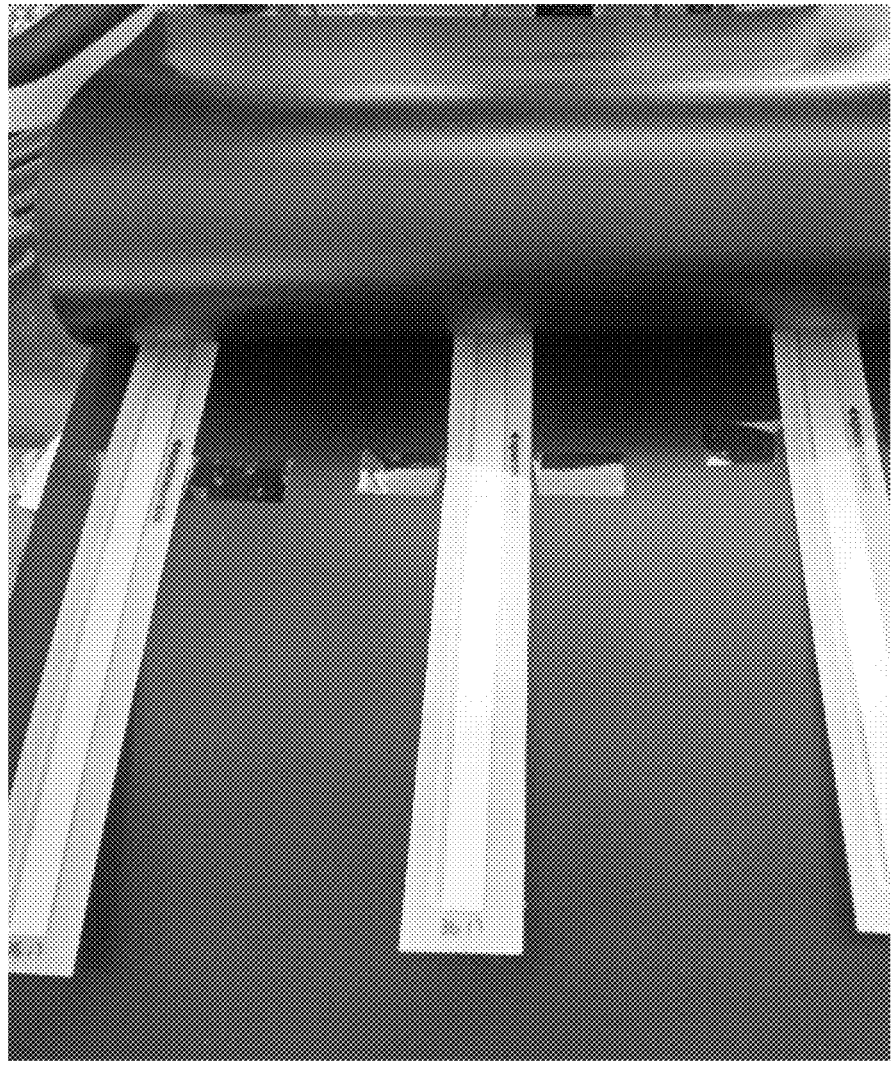
FIG. 8 is an enlarged illustration of the membrane potentiometers sensors shown in FIGS. 6 and 7.

In FIG. 8, the impact sensors 210 are shown more clearly here with the rubber surface of the sensor mat 105 being peeled back exposing the membrane potentiometers 210.

Figure 9:
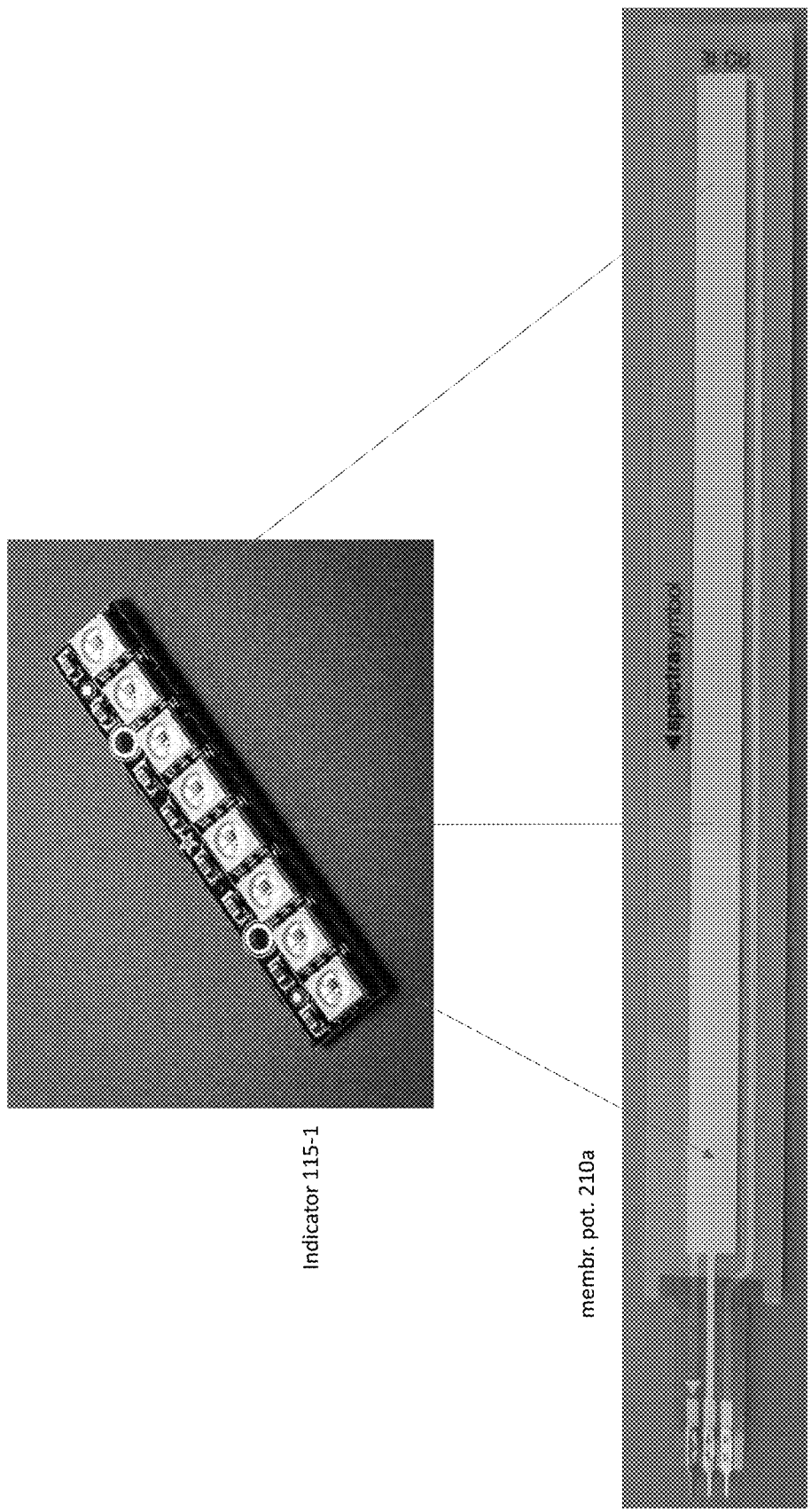
FIG. 9 illustrated how a strike location on the membrane potentiometer sensor maps to an indicator in a linear group of indicators.

FIG. 9 shows how the impact sensors 210 relates to a multi-indicator 615a, such as a Neopixel Stick having 8 LEDs. If an impact is sensed at location "A" on impact sensor 210a, a signal representative of the sensed location "A" is sent to controller 630 of base module 600 and converted to the second LED from the left of impact indicator 615a. Similarly, an impact at location "B" would correspond to the fourth LED from the left of impact indicator 615a, and an impact sensed at location "C" would correspond to the last LED to the right of impact indicator 615a.

Even though impact indicator 615a with 8 LEDs was used here as an example, any convention, known types of indicators or display devices which can illustrate a sensed impact at a plurality of different locations may be used.

To further show how this is accomplished, we now refer back to FIG. 7. The signals from the membrane potentiometers 210 pass through an electrical coupling 230 to a mat sensor transmitter 350.

The signals are then transmitted from mat sensor transmitter 350 to a base receiver 650 of base module 600 then to a base microcontroller 630. Base microcontroller 630 has a processor 610 that determines which LED on the impact indicator 615 pertains to the location of impact and the signal from impact sensor 210.

The results are sent to a display device 670 which is connected to impact 615a, 615b and 615c. The LED activated on the impact indicators 615a, 615b, 615c mimic the location impacted on impact sensors 210a, 210b, 210c, respectively, as described above.

This lighted LEDs now show an angle of the swing. In this case, the swing angles from farther to the front on the right to farther to the back and left through the forward swing.

As with the previous embodiment, based upon the relative pressure in the membrane potentiometers 210 sense, the arc of the swing, as shown in FIGS. 3A, 3B and 3C can be determined. This will indicate an ideal swing, FIG. 3A, a thin impact, FIG. 3B and a "fat shot" impact, FIG. 3C. The lights can illuminate with colors to indicate the type of swing with green for ideal, yellow for thin impact and red for 'fat shot' impact.

A handedness switch 840 is on the base module 600 which can be manually operated by the golfer 3. Handedness switch 840 provides its current setting to processor 610. The processor 610 will reverse the directions similar to that described in the previous embodiment.

Figure 10:
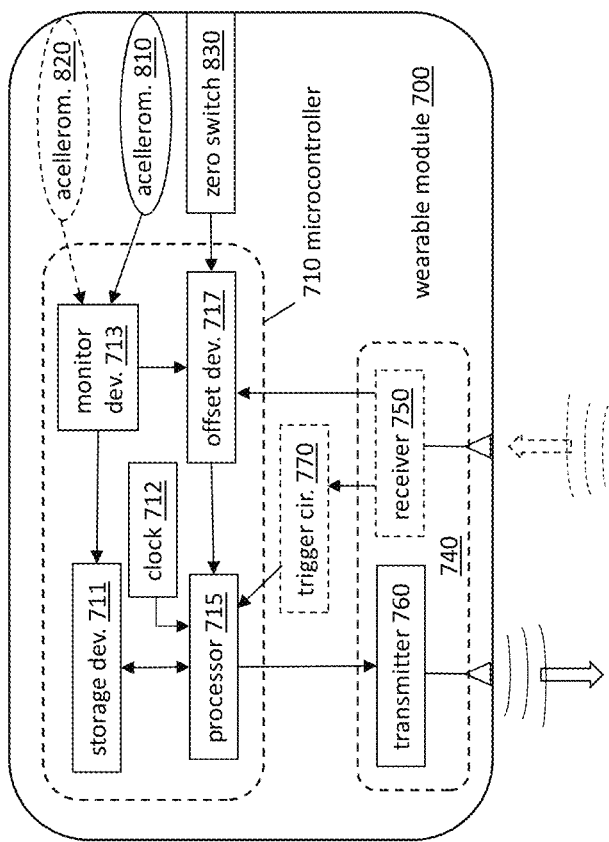
FIG. 10 is a more detailed schematic illustration of the wearable module of FIGS. 6 and 7.

FIG. 10 shows a more detailed diagram of the wearable module 700 that monitors hip rotation of golfer 3. Hip rotation generally is measured around an axis "A" running through the length of the golfer, as shown in FIG. 6. The circular arrow shows a positive angle in the direction of the forward swing for a right-handed golfer.

Wearable module 700 includes at least on accelerometer 810 capable of measuring acceleration of the wearable module 700. Accelerometer 810 provides a signal indicating the acceleration it is experiencing when operational.

For example, the accelerometer shown in FIG. 11A may be used. This is a GY 521 MPU-6050 3-axis gyroscope Module 6 DOF 6-axis Accelerometer Gyroscopic Sensor Module with a 16-bit A/D converter, data output IIC, I2C.

Figure 11B:
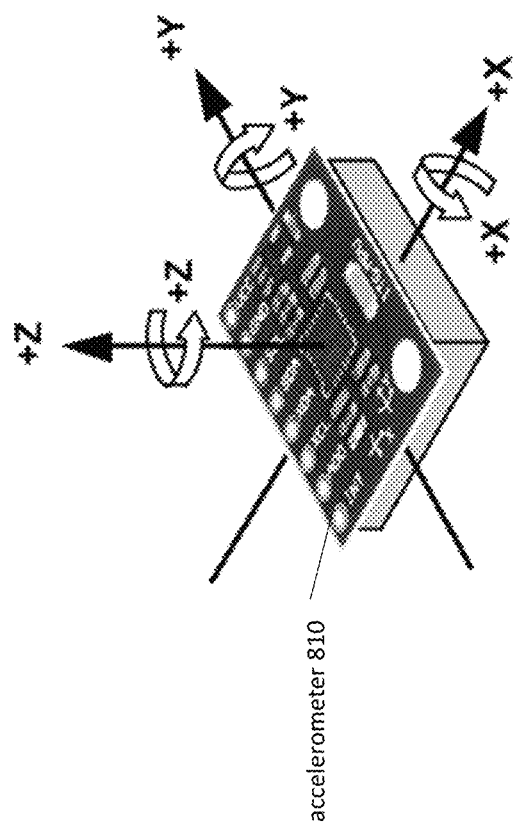
FIG. 11B shows an accelerometer sensing rotation about 3 orthogonal axes that is compatible with the current invention.

FIG. 11B shows an accelerometer 810 sensing rotation about 3 orthogonal axes that is compatible with the current invention.

This provides raw data that is monitored and processed by the monitor device 713 of the microcontroller 710. In at least one embodiment, monitor device 713 is preprogrammed with the approximate orientation of axis "A" of FIG. 6 passing through golfer 3.

Monitor device 713 has the capability to determine components of acceleration about axis "A".

Alternatively, accelerometer 810 receives information as to the orientation of axis "A" and determines the components of acceleration about axis "A".

In still another embodiment, axis "A" is assumed to be vertical and the components of acceleration are used in the calculations.

The system employs a zero switch 830 on wearable module 700. When the golfer is lined up, squared up and ready to begin his/her swing, he/she presses the zero switch 830. This identifies a reference angle from which to measure rotation angle. This reference angle is sent to offset device 717.

Offset device 717 adjusts the readings it receives from monitor device 713 by the zero-reference angle and the setting of the handedness switch 840 to result in an adjusted angle. The adjusted angle is provided from offset device 717 to processor 715. Microcontroller 710 provides the adjusted angle to transmitter 760 and adjusted angle is then transmitted to base module 600.

Receiver 750 and transmitter 760 collectively may be referred to as transceiver 740.

In another embodiment, microcontroller 710 employs a clock 712 adapted to provide time stamps to acquired data. Acceleration or components of acceleration are stored in storage device 711, along with the timestamp from clock 712.

Processor 715 determines which stored rotation information pertains to the time when golfer 3 strikes impact sensors 210a, 210b, 210c. This information is provided to wearable transceiver 740 which transmits the rotation information down to base transceiver 650 of base module 600.

Base transceiver 650 provides the rotation information to base processor 610 that determines which hip rotation indicator 515a, 515b, 515c to activate, and which color to activate the indicator based upon the value of the rotation information at the time golfer 3 impacts the golf ball 305.

In at least one embodiment, wearable transceiver 740 of wearable module 700 has a receiver 750. Receiver 750 receives a signal from base module 600 at the time of impact on sensor mat 105 (and golf ball 305).

This impact signal is sent to an optional trigger circuit 770 that creates a signal to notify processor 715 of the golf ball impact. Processor 715 then acquires the current rotation information from storage device 711 (or directly from monitor device 713 or accelerometer 810), offsets the rotational angle provided when the zero switch 830 was pressed and reverses the angular polarity of the handedness switch 840 indicates a left-handed golfer to result in the Estimated Hip Rotation Angle (EHRA) at the time of impact.

The EHRA is then sent from processor 715 to transmitter 760, base transceiver 650, processor 610 then to display device 670 that activates one of the hip rotation indicators 515a, 515b, 515c.

Microcontroller 710 is coupled to the accelerometer 810 and includes a monitor device 713 that monitors the output of accelerometer 810 and may store some of the monitored information in a storage device 711.

A processor 715 reads the information stored in storage device 711.

The zero switch 830 may be manually operated by golfer 3. When the golfer is 'squared-up' with the golf ball, the golfer 3 actuates the zero switch 830 to indicate the zero-angle reference point from which hip rotation angle is to be measured. The zero-angle reference point is provided to the processor 715 to adjust the raw angle provided by the accelerometer 810.

The processor 715 of microcontroller 710 sends the processed angles, each with a time stamp to the transmitter 760 of the wearable transceiver 740. This angular information is transmitted to the base module 600.

Referring now back to FIG. 7, base transceiver 650 receives the angular information transmitted by wearable module 700.

The EHRA is received by base receiver 650 through antenna 651. ERHA is then provided to base microcontroller 630.

Base microcontroller 630 then calculates if the adjusted angle is between one of three different ranges and lights indicator light 515a, if it is in the first angular range, indicator light 515b, if it is in the second angular range, and 515c if it is in the third angular range.

The position of the handedness switch 840 provided by the receiver 750 causes the offset device 717 to reverse the polarity of rotation measurement. For example, a path moving in a counter-clockwise direction (for switch position corresponding to a right-handed golfer) would be considered a positive rotation angle, and counterclockwise would be considered a negative rotation angle.

And if the handedness switch were in the opposite position indicating a left-handed golfer, rotation in a clockwise direction would be a positive rotation angle and rotation in a counter-clockwise direction would be considered a negative rotation angle.

Depending upon the position of the handedness indicator switch 840, it may illuminate at least one of the indicators 515a, 515b, 515c red, yellow or green.

The indicators may also be activated with a green color indicating a correct angle, a less than correct angle being a yellow color and a poor hip rotation being a red color.

For a right-handed golfer, example hip rotation ranges would be activating indicator 515a green for a hip rotation of 41 to 90 degrees; activating indicator 515b yellow for a hip rotation of 21 to 40 degrees and activating indicator 515c red for a hip rotation of 0 to 20 degrees.

For a left-handed golfer, example hip rotation ranges would be activating indicator 515c green for a hip rotation of −41 to −90 degrees; activating indicator 515b yellow for a hip rotation of −21 to −40 degrees and activating indicator 515a red for a hip rotation of 0 to −20 degrees.

Please note that even though the example has been shown for the use of 3 indicator lights for the impact location and three indicator lights for the golfer's hip rotation, various numbers and types of known indicators may be used to indicate the impact location and hip rotation.

In still another embodiment, the monitor device 713 of microcontroller 710 includes a clock 712 that time stamps each set of rotation information it receives.

Base transceiver 650 receives impact information from sensor mat 105 through mat sensor transmitter 350. The impact information is forwarded on to processor 610. Processor 610 has a clock 612 that time stamps impact information. The impact information and time stamp are sent through base transceiver 650 through receiver 750, trigger circuit 770 and to processor 715. Processor 715 finds the rotation information that has a time stamp closest to that of the impact information time stamp. This rotation information is then used in the calculations to activate one of the indicators 515a, 515b, 515c.

In another alternative embodiment, the monitor device 713 only acquires rotation information from accelerometer 810 when it receives a signal from base module 600 that there has been an impact sensed. This reduces the time which the accelerometer is operational and greatly extends it battery life.

In a clean impact, the gold club head 9 only hits the golf ball 5 and does not trigger any of the impact sensors 210. Therefore, there is another alternative embodiment shown in FIGS. 6, 7, 25A and 25B which employs a sound sensor module 900 which includes a microphone 913. In this embodiment, at least one microphone 913 is positioned near the golf tee to sense the sound of the golf ball 5 being hit by the golf club head 9.

When the sound of the impact is sensed by the microphone 913, a signal is created and sent to at least one impact sensor 210. This simulates an impact on the impact sensor 210 when there is no impact on the impact sensor but only the sound of the impact on the golf ball.

In this embodiment, the signals are sent to mat sensor transmitter 350 then transmitted to base transceiver 650 of base module 600. The information may be an electronic analog signal or a time in which the impact was sensed.

The hip rotation at the time of impact can then be determined.

In a different alternative embodiment, the signals sensed by microphone 913 are sent directly to the mat sensor transmitter 350, then to base module 600.

Figure 12:
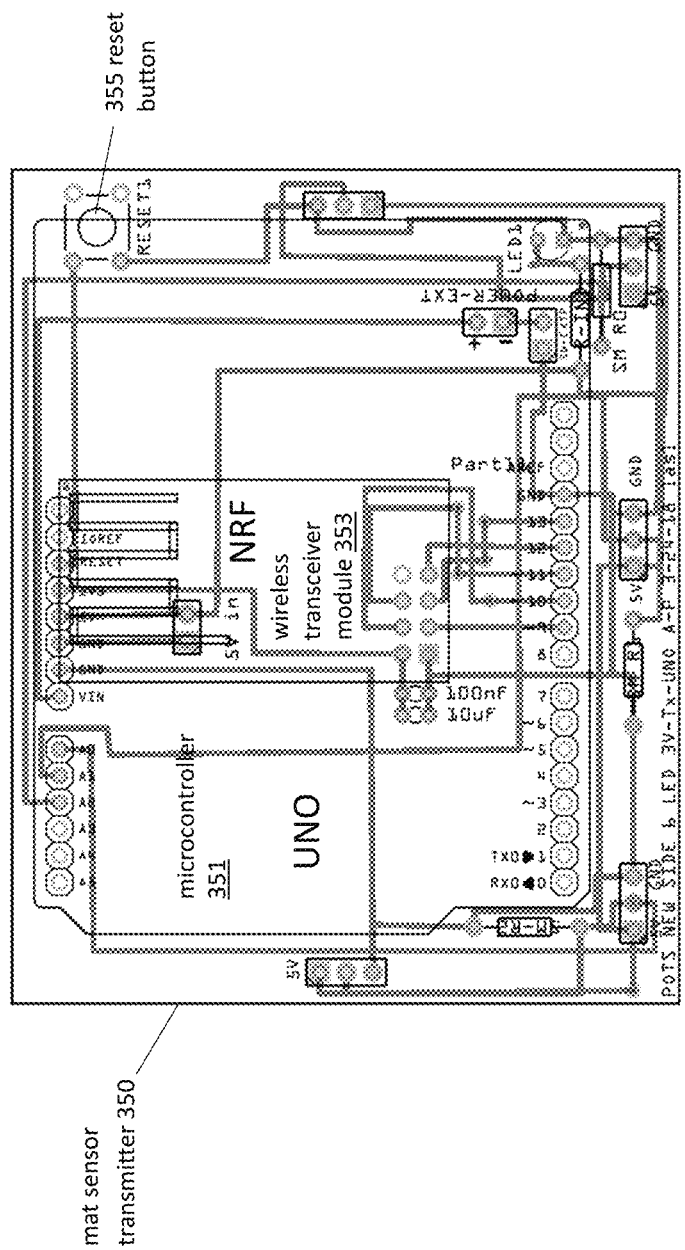
FIG. 12 is a more detailed schematic illustration showing the major parts of one embodiment of the mat sensor transmitter 350 of FIGS. 7, 10, 23 and 24.

FIG. 12 is a more detailed schematic illustration showing the major parts of one embodiment of the mat sensor transmitter 350. In this embodiment, an UNO microcontroller is used as microcontroller 351. A NRF-NRF24L01+ 2.4 GHz Wireless RF Transceiver Module is used as wireless transceiver module 353.

Figure 13:
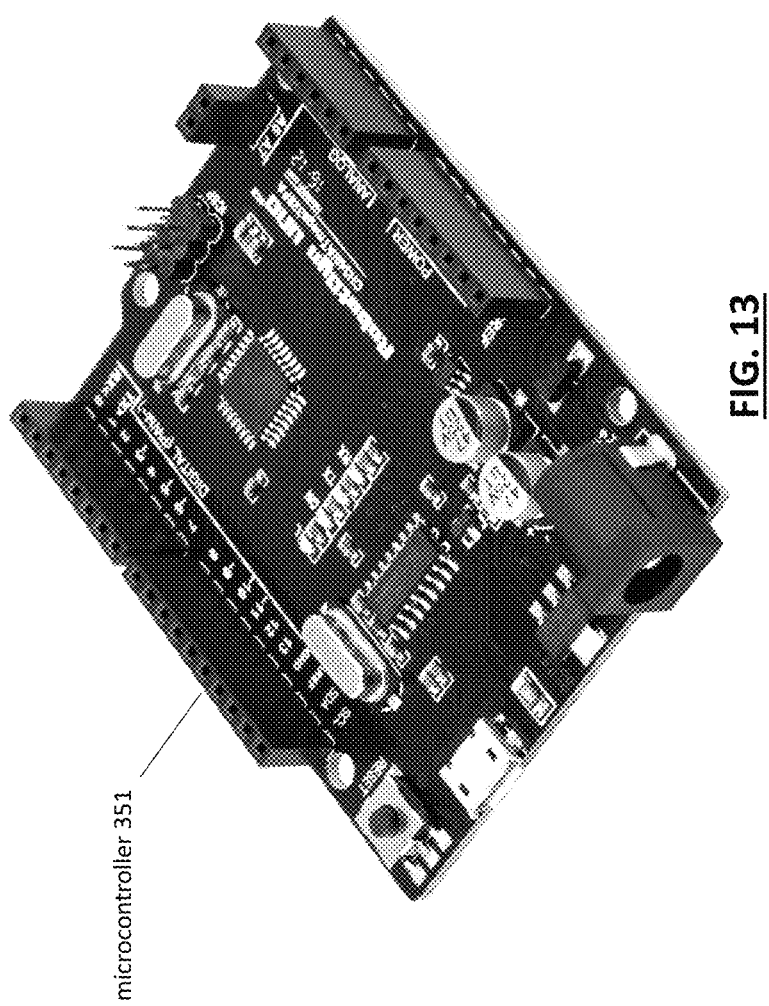
FIG. 13 is an illustration of a microcontroller 351 which may be used in the embodiment of FIG. 12.

FIG. 13 is an illustration of an UNO microcontroller which may be used as microcontroller 351 of FIG. 12. This is an UNO R3 ATmega328/CH340 SMD edition+A6-A7 pins—Enhanced version, Micro-USB, Compatible for Arduino UNO R3 Microcontroller with Bootloader.

Figure 14:
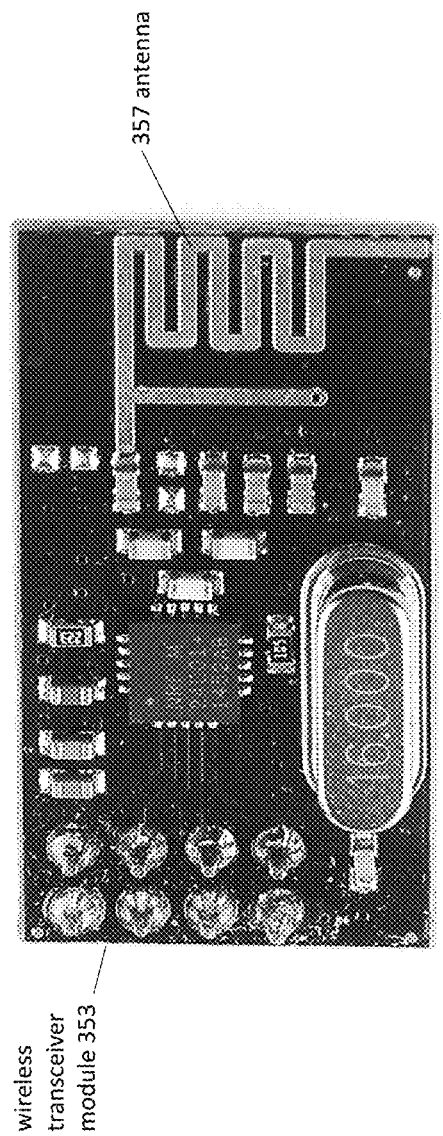
FIG. 14 is an illustration of a wireless transceiver module 353 which is compatible with the mat sensor transmitter 350 of FIGS. 7, 10, 23 and 24.

FIG. 14 is an illustration of a wireless transceiver module 353 which is compatible with the mat sensor transmitter 350 of FIG. 7. More specifically, this is an NRF24L01+2.4 GHz Wireless RF Transceiver Module. It includes an integral antenna 357 for RF transmission.

Figure 15:
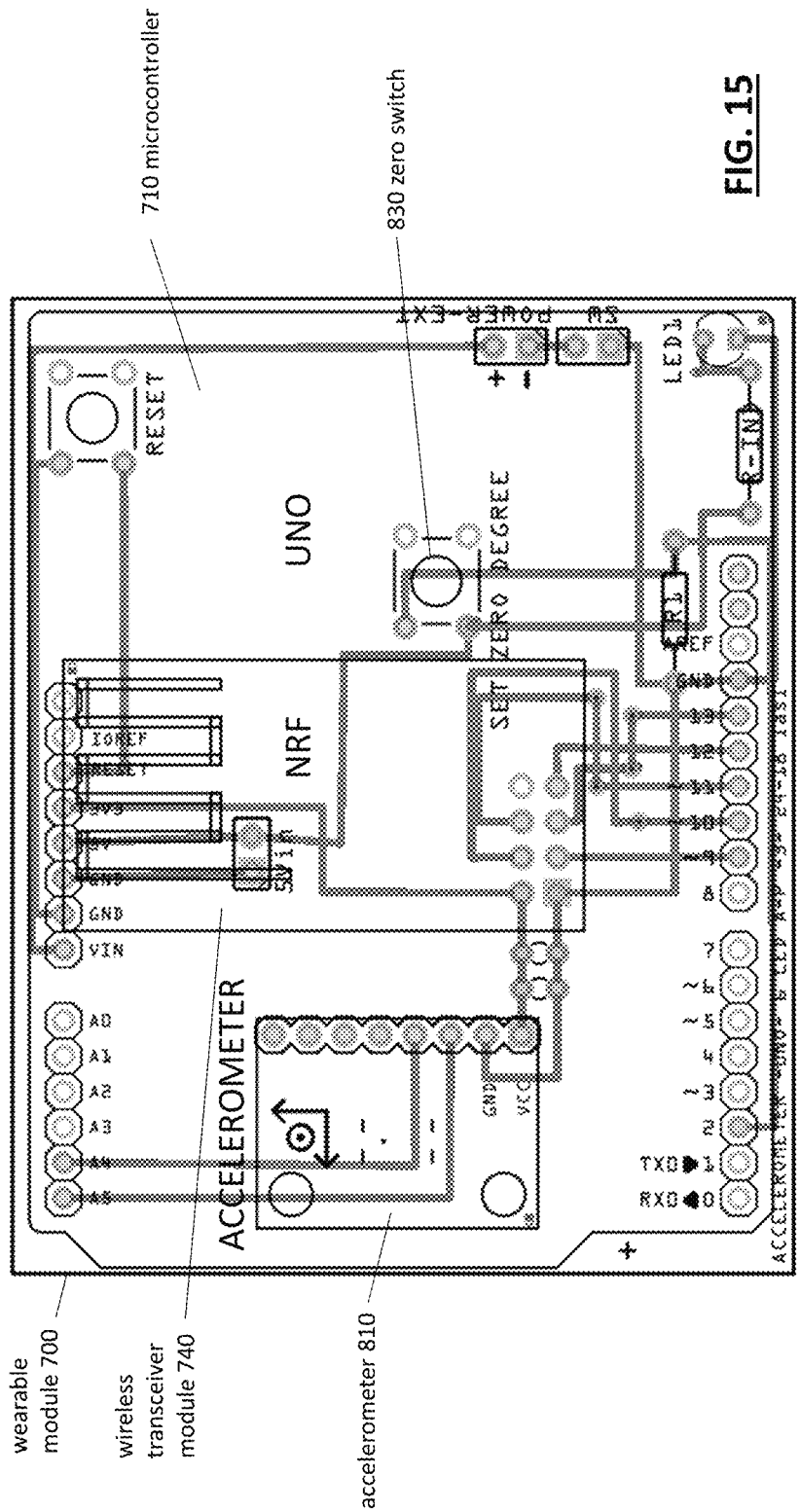
FIG. 15 is another embodiment of the wearable module 700 of FIG. 10.

FIG. 15 is another embodiment of the wearable module 700 of FIG. 10. Here an UNO microcontroller 710, similar to that shown in FIG. 10, is configured to perform the functions of wearable module 700.

Figure 16:
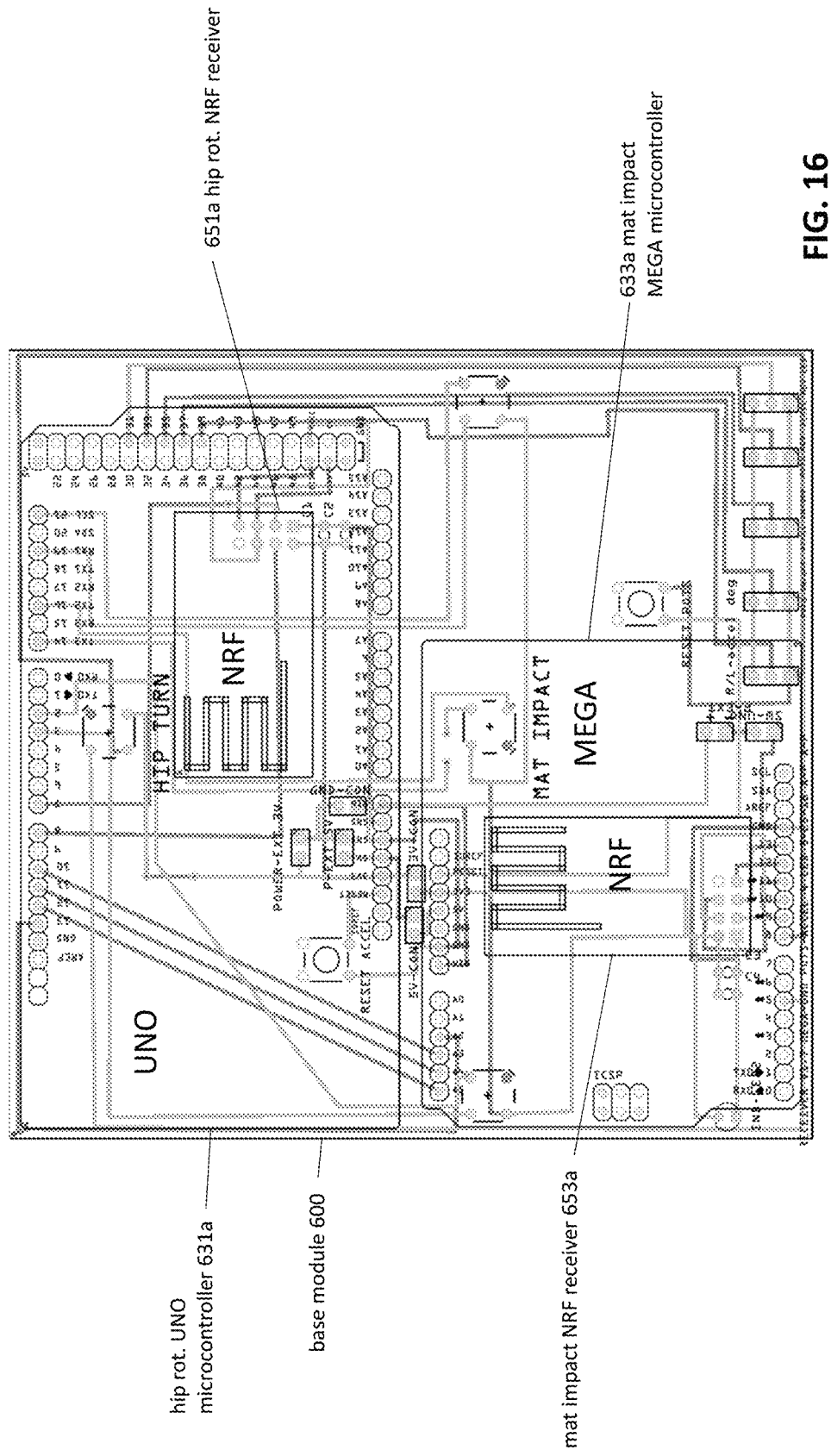
FIG. 16 is an illustration of another embodiment of the base module 600 showing its major elements.

FIG. 16 is an illustration of another embodiment of the base module 600 showing its major elements. Here MEGA mat impact microcontroller 633a is configured to receive impact signals from mat sensor transmitter 350 through mat impact receiver 653a, which may be a NRF-NRF24L01+2.4 GHz Wireless RF Transceiver Module.

A hip rotation UNO microcontroller 631a operates a hip rotation receiver 651b to receive hip rotation information and process it.

Figure 17:
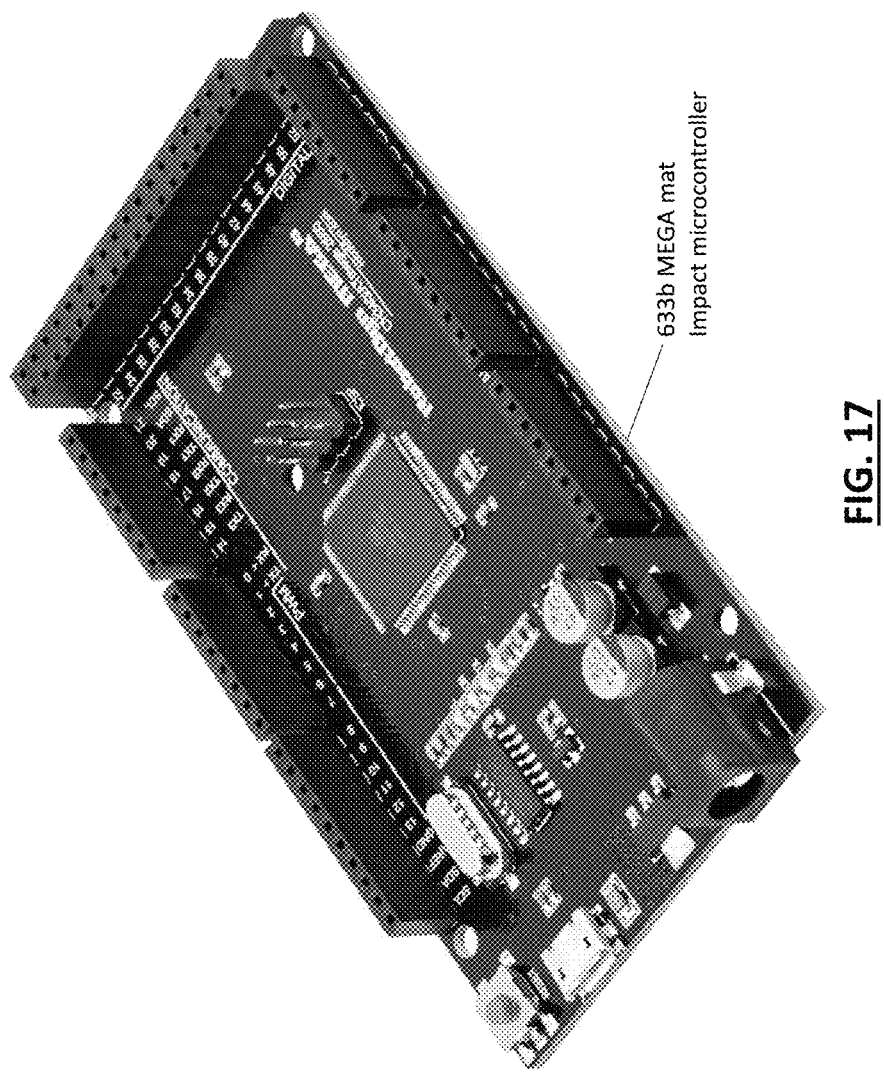
FIG. 17 is an illustration of a MEGA 2560 microcontroller which may be used as either or both base microcontrollers in FIG. 16.

FIG. 17 is an illustration of a MEGA 2560 microcontroller which may be used as either or both base microcontrollers in FIG. 16. This may be a MEGA 2560 R3 CH340G/ATmega 2560-16AU, MicroUSB microcontroller, compatible for Arduino Mega 2560 R3, with Bootloader.

Figure 18:
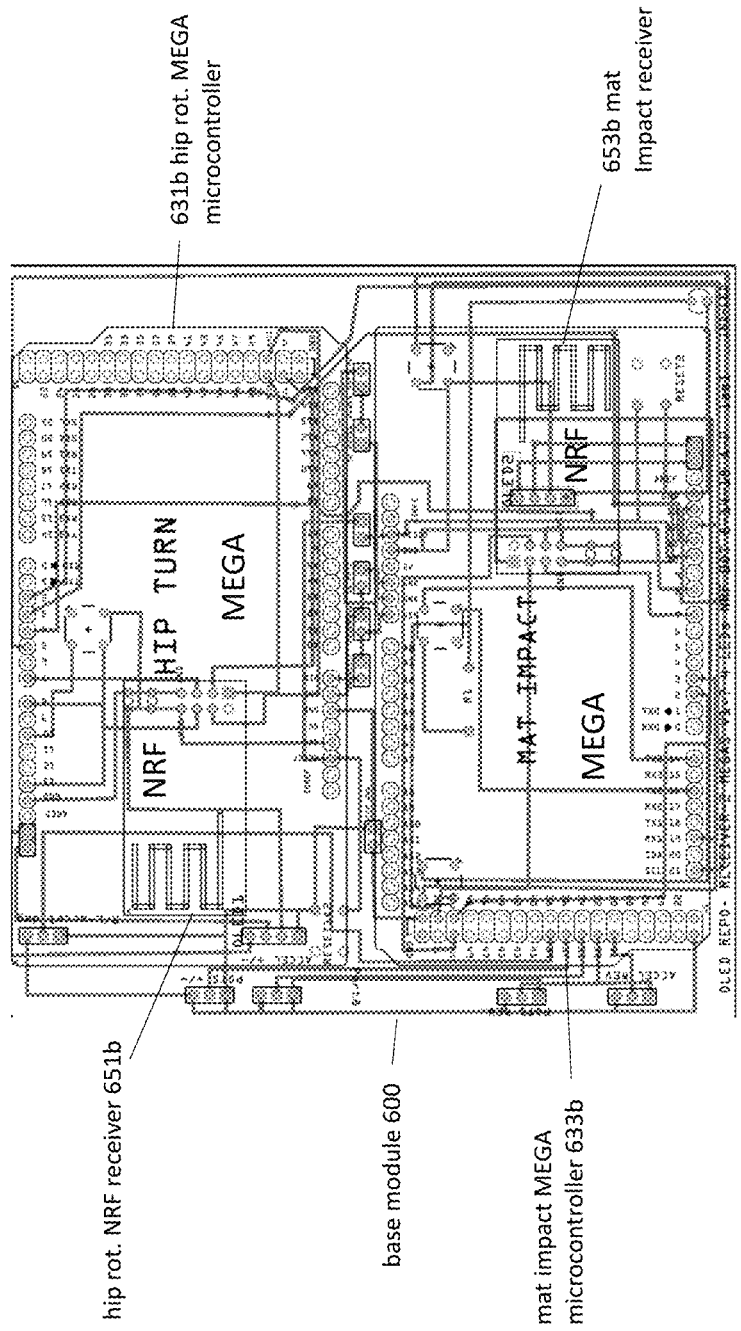
FIG. 18 is another embodiment of the base module 600 showing its major elements.

FIG. 18 is another embodiment of the base module 600 showing its major elements. This is similar to that of FIG. 16, except this embodiment employs two MEGA microcontrollers 631b, 633b instead of an UNO microcontroller 631a and a MEGA microcontroller 633a. One MEGA microcontroller, mat impact microcontroller 633b, operates the mat impact receiver 653b and receives mat impact signals.

The second MEGA microcontroller acts as a hip rotation microcontroller 631b operating hip rotation receiver 651b to receive hip rotation information.

Figure 19:
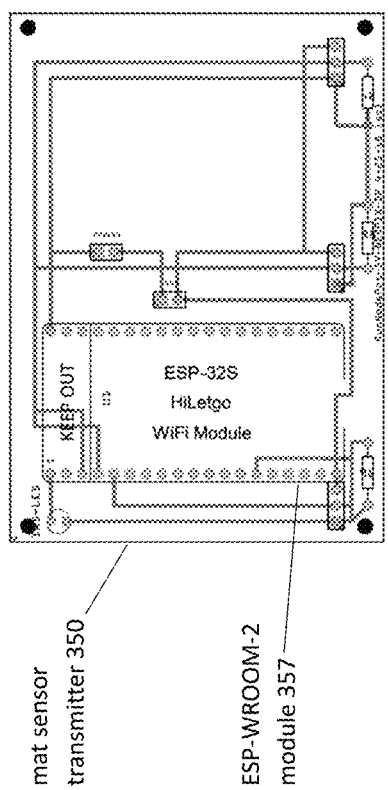
FIG. 19 is another embodiment of the mat sensor transmitter shown in FIG. 7.

FIG. 19 is another embodiment of the mat sensor transmitter 350 as shown in FIG. 7. N ESP-WROOM-2 module 357 is configured to perform the functions of mat sensor transmitter 350 shown in FIG. 7.

Figure 20:
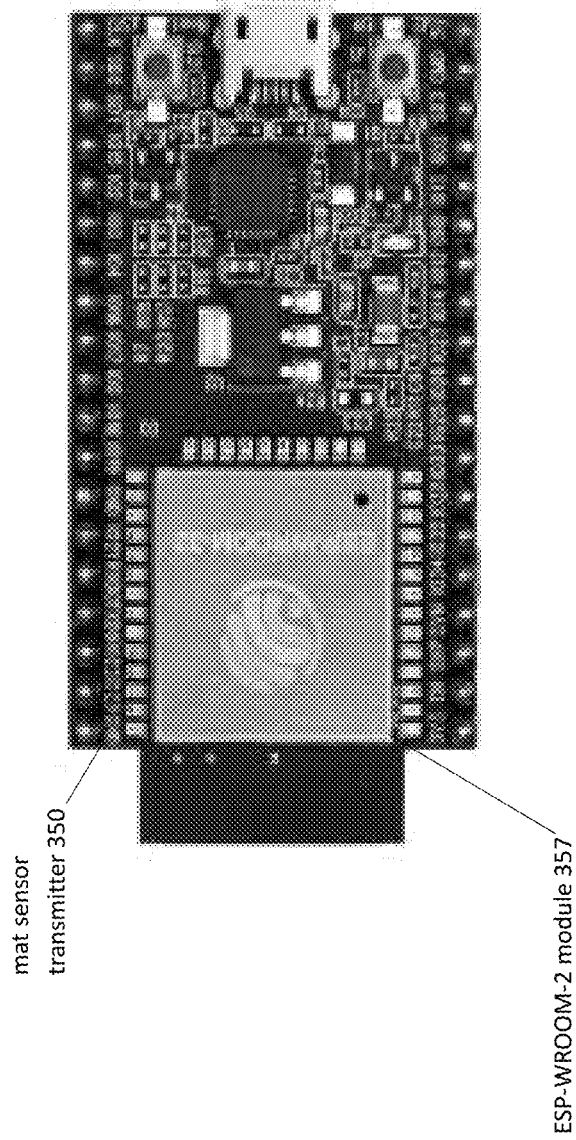
FIG. 20 is an ESP-DEVKITC ESP32 Module Development Kit employing a ESP-WROOM-32 module which can be configured to perform the functions of mat sensor transmitter 350 of FIG. 7.

FIG. 20 is an ESP-DEVKITC ESP32 Module Development Kit employing a ESP-WROOM-32 module which can be configured to perform the functions of mat sensor transmitter 350 of FIG. 7. The ESP-DEVKITC ESP32 Module Development Kit includes a mounted ESP-WROOM-32 module that combines Wi-Fi, Bluetooth, and Bluetooth LE for a variety of diverse applications.

This module comes fully-equipped with 2 CPU cores that can be controlled and powered individually, and with an adjustable clock frequency (80 MHz to 240 MHz). By powering off the CPU, the low power co-processor can be used to constantly monitor the peripherals for changes or crossing of thresholds.

Figure 21:
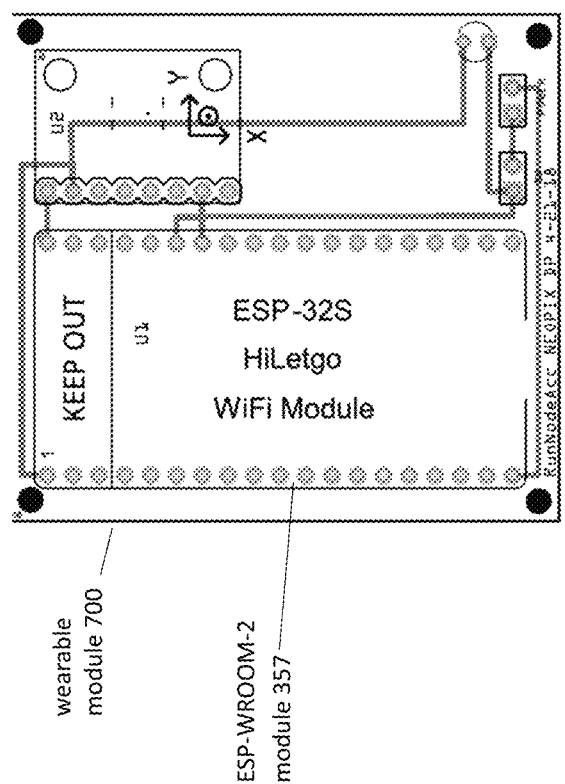
FIG. 21 is an ESP-DEVKITC ESP32 Module Development Kit employing a ESP-WROOM-32 module which can be configured to perform the functions of wearable module 700 of FIG. 10.

FIG. 21 is an ESP-DEVKITC ESP32 Module Development Kit employing a ESP-WROOM-32 module which can be configured to perform the functions of wearable module 700 of FIG. 10. ESP-WROOM-2 module 357 measures acceleration and hip rotation and transmits it to base module 600.

Figure 22:
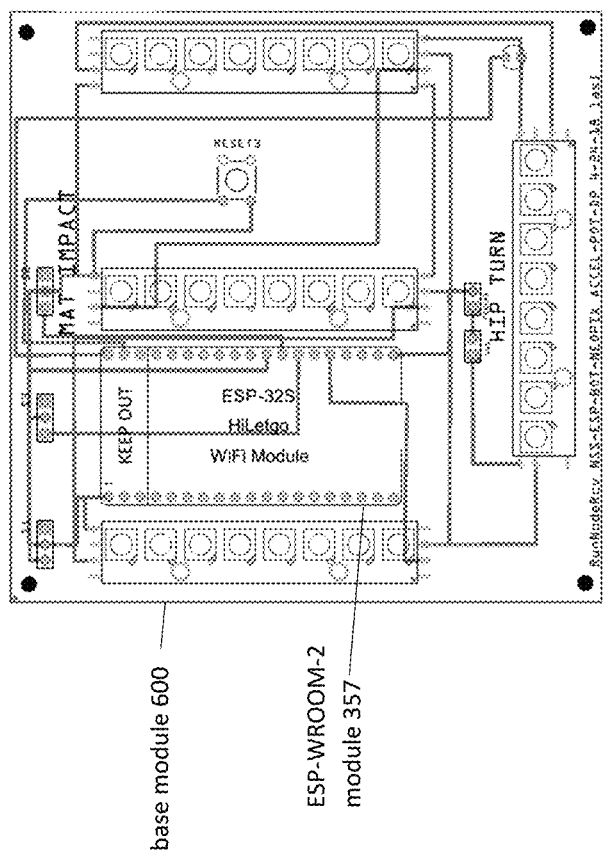
FIG. 22 is another embodiment of the base module 600 employing an ESP-DEVKITC ESP32 Module Development Kit having an ESP-WROOM-32 module which can be configured to perform the functions of base module 600 of FIG. 7.

FIG. 22 is another embodiment of the base module 600 employing an ESP-DEVKITC ESP32 Module Development Kit having an ESP-WROOM-32 module which can be configured to receive both the transmitted impact information and the hip rotation information, calculate which color to light which indicators for both the impact indicators 615a, 615b, 615c and the hip rotation indicators 515 and otherwise perform the functions of base module 600 of FIG. 7.

In another embodiment, a standard smartphone may be repurposed to act as the wearable device 700. The functions of the wearable module 700 are performed by a standard 'smartphone'. A standard smartphone includes an active element such as a base controller 630 which may have an internal memory which can have pre-stored executable routines, a 'scratch area' and an area to store information. The smartphone can have pre-stored routines ("Apps") which, when run by the microcontroller 630, imitate the functions of various elements of the system.

The smartphone is worn by the golfer 3 and moves with the golfer 3 similar to the wearable module 700 of FIG. 6.

A standard smartphone includes transceivers, such as base transceiver 650 which can communicate with Bluetooth devices, Wi-Fi devices, cellular systems, other computing devices and internet nodes.

A standard smartphone incorporates hardware and software which can determine position and orientation of the phone. It also has one or more accelerometers with corresponding hardware and software which can sense rotational motion similar to the accelerometer 810 and monitor device 713 of FIG. 24.

A touchscreen of a standard smartphone can display interactive button icons on its screen and sense when one of the button icons has been touched. Therefore, it can display a 'zero button' icon for indicating the rotation angle which corresponds to a 0-degree rotation.

The golfer 3 lines up with the golf ball 305 for the swing, then presses the zero button icon to indicate the current location is the zero rotation angle and is used as a reference point.

The smartphone typically includes Bluetooth and Wi-Fi communication capabilities. Therefore, when the smartphone memory is running the proper stored executable code, it can function to measure rotation angles of the smartphone as it moves with the golfer 3 during the swing. It can also transmit this information to a base module 600 that displays the rotation angle on hip rotation indicators 615 as described for other embodiments above.

Figure 23:
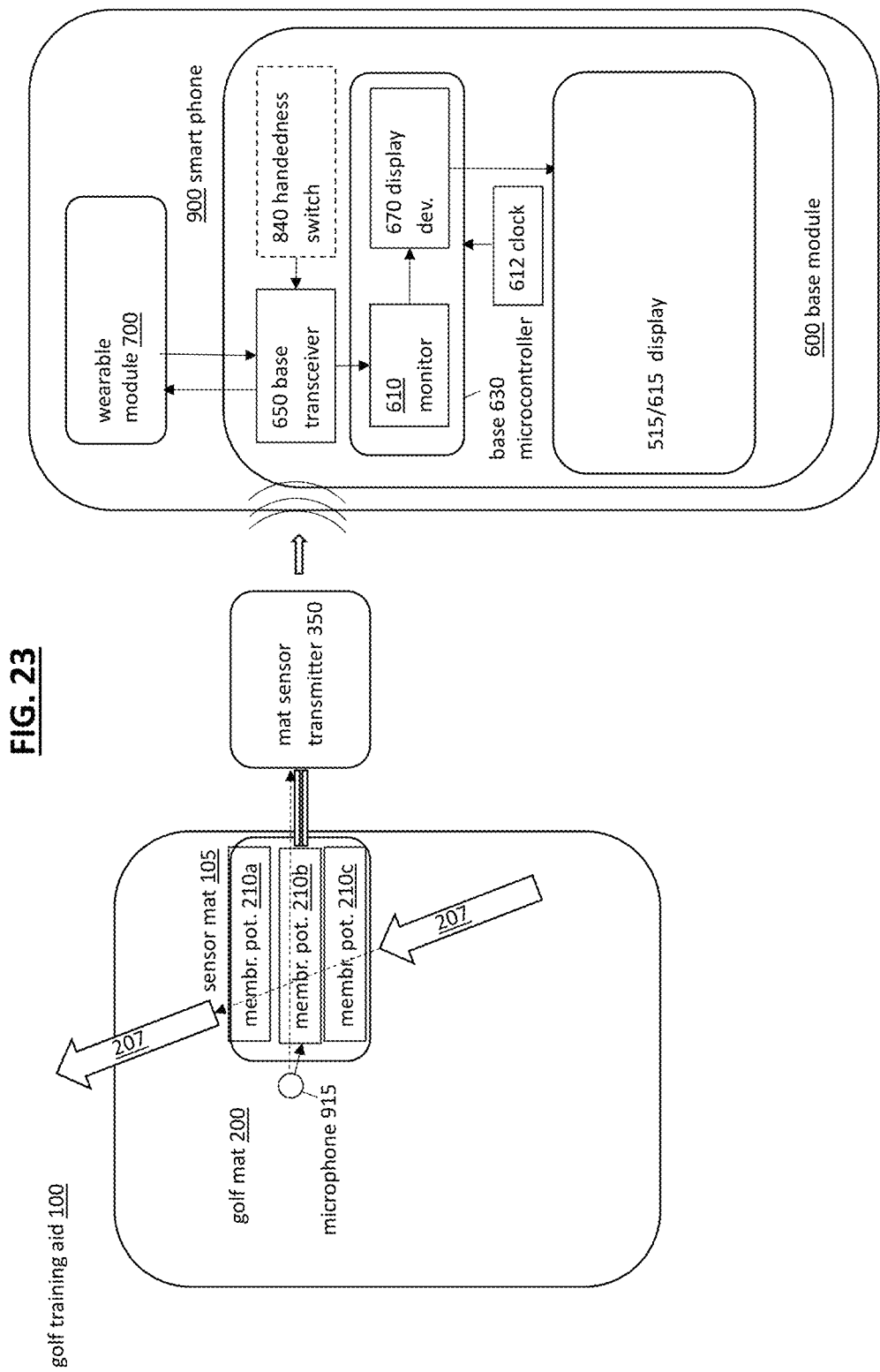
FIG. 23 is another embodiment of the golf training aid 100 according to the current invention, which implements a smartphone to perform the functions of the base module and wearable module that shows the base module in greater detail.

In still another embodiment, the functionality of both the base module 600 and the wearable module 700 are performed by a standard 'smartphone' as shown in FIGS. 23 and 24. As indicated above, a standard smartphone 900 includes a base microcontroller 630 that has an internal memory which can have pre-stored executable routines, a 'scratch area' and an area to store information. The smartphone 900 can have pre-stored routines ("Apps") which, when run by the processor, imitate the functions of various elements of the system.

FIG. 23 is another embodiment of the golf training aid 100 according to the current invention, which implements a smartphone to perform the functions of the base module 600 and wearable module 700 that shows the base module 600 in greater detail. The elements listed will have the same functions as described above, except they may be implemented on a smartphone's microprocessor running executable code stored in a memory. The memory may also have a scratch area for storing intermediate values that are typically erased after the calculations are completed. It may also have an area for storing calculated or acquired information for later used.

Figure 24:
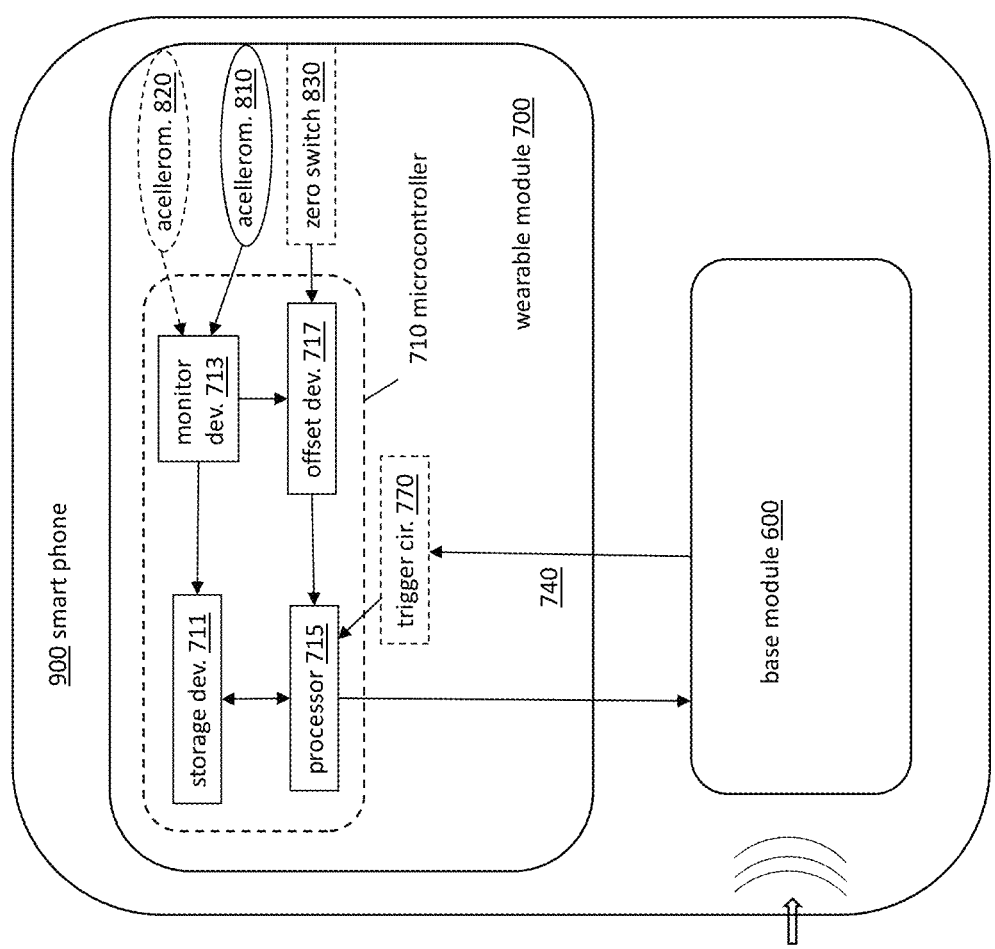
FIG. 24 is the embodiment of FIG. 23 showing the wearable module 700 in greater detail.

In this embodiment, there is no longer any need to wirelessly communicate between the base module 600 and the wearable module 700. These may now communicate directly. The LED indicators may be replaced by the cellphone graphics of the touch screen which may also replace the handedness switch and the FIG. 24 is the embodiment of FIG. 23 showing the wearable module in greater detail. In this embodiment, the internal accelerometers are monitored by the smartphone processor running executable code to simulate the functions performed by the elements shown.

"And/or" as used herein, for example, with option A and/or option B, encompasses the separate embodiments of (i) option A, (ii) option B, and (iii) option A plus option B. Where a numerical range is provided herein, it is understood that all numerical subsets of that range, and all the individual integers contained therein and one tenth portions thereof, are provided as part of the invention as individual embodiments.

Therefore, the golf aid system 100 can be set up such that the sensor mat 105 and impact sensors 210 pass impact information to mat sensor transmitter 350, and mat sensor transmitter 350 transmits the impact information wirelessly to the smartphone 900. The smartphone 900 is attached to the golfer 3 and moves with golfer 3. The smartphone can display a "zero button" icon on its screen as an interactive button.

The golfer 3 lines up with the golf ball 305 for the swing, then presses the zero button icon to indicate the current location is the zero rotation angle and is used as a reference point.

The impact sensors 210 then create a signal when an impact is sensed, pass it to the mat sensor transmitter 350 which wirelessly transmits the impact information to the smartphone 900, possibly by Bluetooth communication.

The base microcontroller 630 of smartphone 900 then identifies the sensed hip rotation angle which corresponds to the time that the impact was sensed.

The smartphone 900 identifies if the inward/outward swing angle and determines how close this is to a straight swing.

The smartphone 900 also identifies the location of the apex of the swing and determines how close this is to a perfect swing.

These determinations may be color coded from good (green) to bad (red) and displayed in at least one of several different methods of display. It may display the swing form both a top and side elevation view. This may be by still pictures, or by moving animation.

The swing may be viewed from a perspective view and shown as a still image, or as a moving animation in three dimensions.

In still another embodiment, at least one accelerometer 850, or RF tracking device may be attached near the golf club head 9. This adds a new dimension to the measurements. Now the club swing can be tracked in real-time or near real-time. This allows the smartphone 900 to reconstruct the swing in 3 dimensions alone with club head speed. These can be played back as indicated above in slow motions, at the actual relative speed. This can show 'jerky' or choppy swings, as well as smooth, even swings by monitoring club head speed throughout the swing.

Figure 25B:
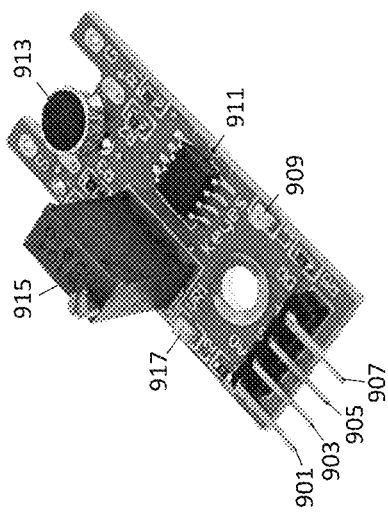
FIG. 25B is perspective view of the sound sensor module of FIG. 25A.
Figure 25A:
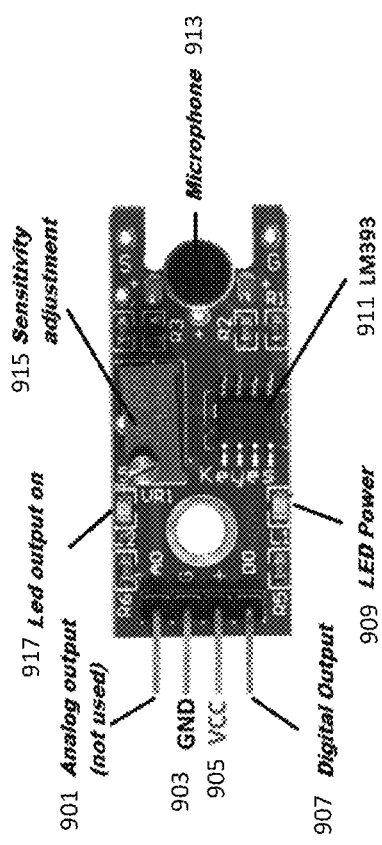
FIG. 25A is a plan view of a sound sensor module compatible with one embodiment of the current invention.

FIG. 25A is a plan view of a sound sensor module 900 compatible with one embodiment of the current invention.

FIG. 25B is perspective view of the sound sensor module 900 of FIG. 25A.

Sound sensor module 900 has 4 pins. Pin 903 is a ground pin. Pin 905 is a voltage input pin. Pin 901 is an analog output pin and pin 907 is s digital output pin.

The sensitivity of a microphone 913 is adjusted by the screw in sensitivity adjustment circuit 915.

There is a connection 909 for LED power and a connection 917 indicating when LED output is on.

Mounting this sound sensor module 900 near the golf ball allows the microphone 913 to 'hear' the golf ball impact. If an output pin 901/907 is connected to an analog/digital circuit, respectively, connected to at least one impact sensor 210, it will send a signal to the base unit 600 indicating when it 'heard' the golf ball impact. The hip rotation at that time will then be used to trigger hip rotation indicators 515.

Please it should be understood that elements of an embodiment shown may be exchanged for equivalent elements in other embodiments. For example, the impact sensors 125 may be exchanged for impact sensors 210. Or the indicators 115 may be replaced by indicators 515/615 of FIG. 7 or 23.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

I claim:

1. A golf training aid that monitors a golfer swinging a golf club such that the head of the golf club impacts a location near the golf ball, comprising:
   one or more first sensors disposed under a first region of a sensor mat;
   one or more second sensors disposed a predetermined distance from the one or more first sensors under a second region of the sensor mat;
   one or more third sensors disposed the predetermined distance from the one or more second sensors under a third region of the sensor mat;
   a timer circuit coupling each of the first, second, and third sensors to a respective first indicator, second indicator, and third indicator, the timer circuit triggering, over a predetermined amount of time, one or more of the first indicator upon the one or more first sensors detecting an impact in the first region on the golf mat, the second indicator upon the one or more second sensors detecting an impact in the second region on the sensor mat, and the third indicator upon the one or more third sensors detecting an impact in the third region on the golf mat;

a wearable device adapted to attached to a near a hip area of the golfer and monitor rotation of the golfer's hip area during the swing and wirelessly transmit an indication of the rotation of the golfer hip during impact with the golf ball;

the wearable device comprising:

at least one accelerometer adapted to measure rotation of hips of the golfer at impact of the golf ball;

a base device coupled to the wearable device, adapted to receive the wireless transmission from the wearable device indicating the rotation of the golfer's hip at the time of impact, calculate the proper indicator of the rotation indictor device and activate it and a handedness switch that switches the first and third impact indicators between indicating an ideal impact detection and a fat shot impact detection, and it causes the golfer's hip rotation to change polarity.

2. The golf training aid of claim 1 further comprising:

a first indicator that is activated when the rotation of the golfer's hips is in a proper rotation range when the golf ball is impacted, a second indicator that is activated when the golfer's hip rotation is in a second rotation range corresponding to a less than optimum swing, and a third indicator that is activated when the golfer's hip rotation is in a third rotation range indicating a poor swing.

3. The golf training aid according to claim 1, wherein the base module has a transceiver which communicates via radio-frequency transmission with the transceiver in the wearable device.

4. The golf training aid according to claim 1, further comprising:

a sound sensor which is adapted to monitor sounds and send a signal indicating when it senses an impact of a golf club head with a golf ball.

5. The golf training aid according to claim 4, wherein the base device is coupled to the sound sensor and is adapted to use the measured hip rotation from the wearable device corresponding to the time when the golf club head impacted the golf ball.

6. A method of training a golfer how to properly swing a golf club comprising the steps of:

a. providing the golfer with the golf club having a golf club head;

b. placing a sensor mat having a plurality of impact sensors under a golf mat;

c. positioning a golf ball on the golf mat above the sensor mat;

d. attaching a wearable module to the golfer that is able to monitor its rotational acceleration about an axis passing through the golfer having a sound sensor;

e. zeroing the wearable module when the golfer is in his/her initial position;

f. having the golfer swing the golf club to impact the golf ball and impact sensors 210;

g. monitoring the impact sensors and the wearable module to determine where the impact sensors sense an impact;

h. monitoring the sound sensor to determine when the golf club head impacts the golf ball;

i. determining the rotational angle of the wearable module when the sound sensor indicates that the golf ball was impacted;

j. activating indicators to show at least one of the angle of the swing, the rotation of the golfer's hips, an indication of a good swing, 'thin impact swing' or 'fat shot' impact swing, color coding an indicator with a color to indicate if the impact location was 'good', 'fair' or 'poor', and color coding an indicator with a color to indicate if the golfer's hip rotation was 'good', 'fair' or 'poor'.

7. The method of claim 6, wherein the impact sensors are membrane potentiometers.

8. A golf training system that monitors a swing of a golfer and the swing impact locations of comprising:

a. sensor mat 105 having a plurality of impact sensors in an array in the sensor mat 105 each able to sense an impact of the golf club head, capable of monitoring impact information and creating a signal indicative of the impact information wherein impact information is at least one of the locations of the impacts, strength of the impacts, and timing of the impacts;

b. a sensor mat transmitter coupled to the sensors adapted to receive the signals from the sensors, and wirelessly transmit the impact information;

c. wearable module, attached to the golfer, adapted to sense, measure, and transmit rotation information being angular acceleration approximating rotation of the hips of the golfer;

d. a base module comprising:

i. a base transceiver adapted to:

receive the angular acceleration approximating hip rotation from the wearable module and, receive the signal with the impact information from the sensors;

ii. a plurality of impact indicators, iii. a plurality of hip rotation indicators;

iv. a base controller coupled to the base transceiver, adapted to receive the impact information and the rotation information from the base transceiver, the base controller also coupled to the impact indicator activating an indicator corresponding to the impact location information, and activating a rotation indicator to correspond to the rotation information received;

wherein the base controller is adapted to:

receive the sensors impact information;

approximate a direction of the swing; and activate indicators showing the direction of the swing.

9. The golf training aid of claim 8, wherein the impact indicators comprise:

a conventional digital computer display.

10. The golf training aid of claim 8, wherein the rotation indicator comprise:

a conventional digital computer display.

11. The golf training aid of claim 8, wherein if the hip rotation information is from 41 degrees to 90 degrees, then base controller activates hip rotation indicator indicating a 'good' hip rotation.

12. The golf training of claim 8, wherein if the hip rotation information is from 21 degrees to 40 degrees, then base controller activates hip rotation indicator indicating a 'fair' hip rotation.

13. The golf training of claim 8, wherein if the hip rotation information is from 0 degrees to 20 degrees, then base controller activates hip rotation indicator indicating a 'poor' hip rotation.

14. The golf training aid of claim 8, wherein if the hip rotation information is from 41 degrees to 90 degrees, then base controller activates hip rotation indicator and color codes it green indicating a 'good' hip rotation.

15. The golf training aid of claim 8, wherein if the hip rotation information is from 21 degrees to 40 degrees, then base controller activates hip rotation indicator and color codes it yellow indicating a 'fair' hip rotation.

16. The golf training aid of claim 8, wherein if the hip rotation information is from 0 degrees to 20 degrees, then base controller activates hip rotation indicator and color codes it red indicating a 'poor' hip rotation.

17. The golf training aid of claim 8 wherein the wearable module is a smartphone having a processor running prestored executable code that performs the functions performed by the wearable module.

18. The golf training aid of claim 8 wherein the wearable module is a smartphone having a processor running prestored executable code that performs
- the functions performed by the wearable module; and
- the functions performed by the base module.

19. The golf training of claim 18 further comprises:
- at least one accelerometer attached to the golf club near the head, adapted to measure acceleration of the club head; and
- the prestored executable code is adapted to monitor the acceleration of the golf club head, determine its path during the swing, and provide an image on a screen of the smartphone of a path the golf club head during the swing.

20. The golf training aid of claim 18 further comprises:
- at least one accelerometer attached to the golf club near the head, adapted to measure acceleration of the club head; and
- the prestored executable code is adapted to monitor the acceleration of the golf club head, determine its path during the swing, and provide an animation on a screen of the smartphone of the path the golf club head during the swing.

* * * * *